US012574684B2

(12) United States Patent
Rao et al.

(10) Patent No.: US 12,574,684 B2

(45) Date of Patent: Mar. 10, 2026

(54) LOUDSPEAKER MODULE AND ELECTRONIC DEVICE

(71) Applicant: MERRY ELECTRONICS (SUZHOU) CO., LTD., Suzhou City (CN)

(72) Inventors: Liguo Rao, Suzhou City (CN); Yuanyuan Zhang, Suzhou City (CN); Chunlong Zheng, Suzhou City (CN)

(73) Assignee: MERRY ELECTRONICS (SUZHOU) CO., LTD., Suzhou City (CN)

( * ) Notice: Subject to any disclaimer, the term of this patent is extended or adjusted under 35 U.S.C. 154(b) by 192 days.

(21) Appl. No.: 18/587,594

(22) Filed: Feb. 26, 2024

(65) Prior Publication Data

US 2024/0365066 A1 Oct. 31, 2024

(30) Foreign Application Priority Data

Apr. 28, 2023 (CN) ......................... 202310484303.4

(51) Int. Cl.

*H04R 9/02* (2006.01)
*H04R 1/28* (2006.01)
*H04R 9/06* (2006.01)

(52) U.S. Cl.

CPC ........... *H04R 9/025* (2013.01); *H04R 1/2811* (2013.01); *H04R 9/06* (2013.01)

(58) Field of Classification Search

CPC ........ H04R 9/025; H04R 1/2811; H04R 9/06; H04R 2420/00; H04R 7/045; H04R 2400/07; H04R 2400/11; H04R 2499/11; H04R 9/02

See application file for complete search history.

(56) References Cited

FOREIGN PATENT DOCUMENTS

| | | | |
|---|---|---|---|
| CN | 110381402 | A | 10/2019 |
| CN | 214901294 | U | 11/2021 |
| CN | 115550814 | A | 12/2022 |
| TW | M339177 | U | 8/2008 |

OTHER PUBLICATIONS

Taiwanese Office Action and Search Report for Taiwanese Application No. 112139399, dated Sep. 20, 2024, with English translation.

*Primary Examiner* — Tuan D Nguyen

(74) *Attorney, Agent, or Firm* — Birch, Stewart, Kolasch & Birch, LLP

(57) ABSTRACT

Provided are a loudspeaker module and an electronic device, belonging to the technical field of loudspeakers. The loudspeaker module includes a housing, a connection assembly and a magnetic circuit assembly. A vibration unit and a sound generating unit are disposed in the housing. The connection assembly includes a protrusion, and one end of the protrusion is connected to the housing. The magnetic circuit assembly is disposed between the vibration unit and the sound generating unit, and the sound generating unit shares the magnetic circuit assembly with the vibration unit. The magnetic circuit assembly includes a pole piece and a main magnet, the pole piece is connected to another end of the protrusion, and the main magnet is disposed on the pole piece. The loudspeaker module is capable of having loudspeaker function and vibration motor function, facilitating the miniaturization of the loudspeaker module and the electronic device having the loudspeaker module.

20 Claims, 20 Drawing Sheets

LOUDSPEAKER MODULE AND ELECTRONIC DEVICE

CROSS-REFERENCE TO RELATED APPLICATION(S)

This application claims the priority of Chinese Patent Application No. 202310484303.4, filed on Apr. 28, 2023, the disclosure of which is incorporated herein by reference in its entirety.

TECHNICAL FIELD

The present disclosure relates to the field of loudspeakers and, in particular, to a loudspeaker module and an electronic device.

BACKGROUND

Loudspeakers and vibration motors are an important part of electronic devices, especially in smart wearable devices and smartphones. The loudspeaker is used for converting an electrical signal into an acoustic signal and transmitting the acoustic signal out, and the vibration motor is used for providing tactile feedback.

At present, the loudspeaker and the vibration motor of smartphones and smart wearable devices are two independent parts, i.e., the loudspeaker is manufactured separately, and the vibration motor is also manufactured separately. Therefore, when electronic products are assembled, installation space needs to be reserved for the loudspeaker and the vibration motor on the housing. However, the interior space of wearable devices (such as smartwatches) is very compact, and the loudspeaker and the vibration motor that are separately disposed squeeze the installation space of a battery and other components, resulting in the small size of the battery, thereby reducing the battery life and comprehensive performance of the wearable devices.

Chinese Patent CN110381402A discloses earpiece equipment and a terminal, and specifically discloses that the earpiece equipment includes an equipment body, a sound generating unit and a vibration unit, where the sound generating unit is disposed above the vibration unit in an overlapped manner, and the sound generating unit and the vibration unit are disposed in a hollow area inside the equipment body, integrating the functions of sound generating and vibration in one earpiece equipment, and saving the space occupied by the earpiece equipment compared with that the sound generating unit and the vibration unit are separately provided. However, the sound generating unit disposed above the vibration unit in a simply overlapped manner still occupies a large space.

SUMMARY

The present disclosure is to provide a loudspeaker module and an electronic device.

As described above, the solution in embodiments of the present disclosure is the loudspeaker module.

The loudspeaker module includes a housing, a connection assembly, and a magnetic circuit assembly.

A vibration unit and a sound generating unit are disposed in the housing.

The connection assembly includes a protrusion, and one end of the protrusion is connected to the housing.

The magnetic circuit assembly is disposed between the vibration unit and the sound generating unit, and the sound generating unit shares the magnetic circuit assembly with the vibration unit. The magnetic circuit assembly includes a pole piece and a main magnet.

The pole piece is connected to another end of the protrusion.

The main magnet is disposed on the pole piece.

Optionally, the loudspeaker module of this embodiment of the present disclosure may further include a bottom plate.

Optionally, the bottom plate disposed at the bottom of the housing, and the protrusion forms a boss, where one end of the boss is connected to the bottom plate, and another end of the boss extends toward the magnetic circuit assembly and is connected to the pole piece.

Optionally, the vibration unit includes a counterweight, and the counterweight has a first through hole.

Optionally, the main magnet has a clearance through which the boss passes, and another end of the boss sequentially passes through the first through hole and the clearance and is connected to the pole piece.

Optionally, one main magnet is provided, and the one main magnet has a second through hole.

Optionally, at least one pair of main magnets are disposed on two sides of the boss, where main magnets in each pair of the at least one pair of main magnets are spaced apart so that the clearance is formed.

Optionally, the connection assembly may further include a base plate, the base plate is connected to one end of the protrusion and has two outwardly extending connection arms, the connection arms are connected to the housing, at least two main magnets are provided, and the at least two main magnets are disposed on the pole piece on the two sides of the protrusion.

Optionally, first positioning holes cooperating with the corresponding connection arms are formed in the housing, and each of the corresponding connection arms is disposed in a respective one of the first positioning holes.

Optionally, the housing includes a first housing and a second housing connected to the first housing, one of the vibration unit or the sound generating unit is disposed in the first housing, and another of the vibration unit or the sound generating unit is disposed in the second housing.

Optionally, the first housing has a first notch facing the second housing, and an end surface of the second housing and the first notch form a first positioning hole.

Optionally, the second housing has a second notch facing the first housing, and an end surface of the first housing and the second notch form a first positioning hole.

Optionally, a third notch corresponding to a connection arm of the connection arms is disposed on the first housing, a fourth notch corresponding to the third notch is disposed on the second housing, and the third notch and the fourth notch cooperate to form a first positioning hole.

Optionally, the sound generating unit includes a first magnetic guide, and the first magnetic guide includes a magnetic guide body.

Optionally, an edge of the magnetic guide body extends outwardly to form a plurality of cantilever arms, a second positioning hole corresponding to a cantilever arm of the plurality of cantilever arms is formed in the housing, and the cantilever arm is disposed in a corresponding second positioning hole.

Optionally, two support arms extending toward the base plate are formed on the magnetic guide body, the two support arms are in one-to-one correspondence with the connection arms, each of the support arms is provided with a fifth notch cooperating with a corresponding connection arm, and the corresponding connection arm is disposed in the fifth notch.

Optionally, the sound generating unit further includes a diaphragm, a voice coil, and an edge magnet, where the first magnetic guide has an avoidance hole for avoiding the voice coil, the top of the voice coil is connected to the diaphragm, the edge magnet is spaced apart from the main magnet, a magnetic gap is formed between the edge magnet and the main magnet, and the bottom of the voice coil passes through the avoidance hole and extends to the magnetic gap.

The solution of the electronic device of this embodiment of the present disclosure includes the loudspeaker module of any one of the above.

REFERENCE LIST

Figure 1:
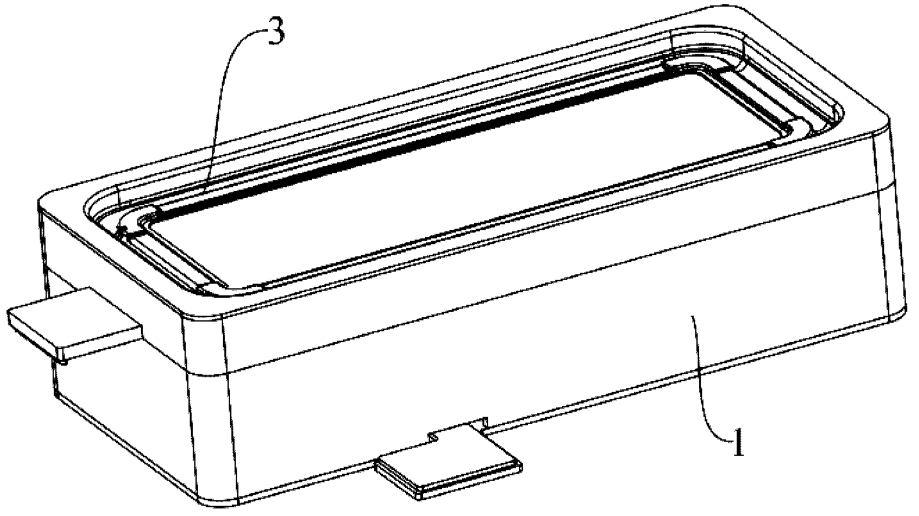
FIG. 1 is a structural diagram of a loudspeaker module according to an embodiment of the present disclosure from a first perspective.

1 housing
101 first positioning hole
102 second positioning hole
11 first housing
111 sixth notch
12 second housing
121 fourth notch
2 connection assembly
21 base plate
211 connection arm
2111 lapping structure
22 protrusion
23 cushion protrusion
24 connection plate
3 sound generating unit
31 first magnetic guide
310 avoidance hole
311 magnetic guide body
312 cantilever arm
313 support arm
3131 fifth notch
32 diaphragm
33 middle stick
34 voice coil
35 first circuit board
351 first pin
36 edge magnet
4 vibration unit
41 counterweight
411 first through hole
412 mounting groove
42 second magnetic guide
43 motor coil
44 second circuit board
441 second pin
45 elastic arm
46 solder lug
5 magnetic circuit assembly
51 pole piece
52 main magnet
6 bottom plate
61 heat dissipation hole
62 support table

DETAILED DESCRIPTION

To make solved problems, provided solutions, and achieved effects of the present disclosure clearer, the solutions of the present disclosure are further described below in conjunction with the drawings and by means of specific embodiments. It should be understood that the specific embodiments described herein are used only for explaining, not to limiting, the present disclosure. It should also be noted that, for facilitating descriptions, only part, not all, of the present disclosure is shown in the drawings.

It should be noted that like reference numbers and letters denote like items in the following drawings. Therefore, once an item is defined in one drawing, no further definition or explanation is required in the following drawings.

In the description of the present disclosure, unless otherwise expressly specified and limited, the terms "connection", "connected", and "fixed" shall be understood in a broad sense, for example, the "connection" may refer to a fixed connection, a detachable connection, or an integral connection; the "connection" may refer to a mechanical connection or an electrical connection; the "connection" may refer to a direct connection or an indirect connection by means of an intermediate medium; or the "connection" may refer to an internal connection between two elements or the interaction between the two elements. For those of ordinary skill in the art, the specific meaning of the above terms in the present disclosure can be understood in specific cases.

In the present disclosure, unless otherwise expressly specified and limited, a first feature disposed "on" or disposed "below" a second feature may be understood that the first feature is in direct contact with the second feature, or the first feature is in contact with the second feature by means of other features between them. In addition, the first feature disposed "on" and "above" the second feature includes the situations that the first feature is right at the top of or in the inclined top of the second feature, or it's merely indicated the horizontal height of the first feature is higher than the second feature. The first feature disposed "under" or "below" the second feature includes the situations that the first feature is right at the bottom of or in the oblique below of the second feature, or it's merely indicated that the horizontal height of the first feature is lower than the second feature.

In the description of this embodiment, the terms "on", "below", "right", etc., or the like, refer to the azimuth or positional relationships shown in the drawings. The terms are used only for facilitating descriptions and simplifying operations, rather than indicating or implying that the provided equipment or element must have a specific azimuth, or must be constructed and operated in a specific azimuth. Therefore, the terms cannot be understood as limiting the present disclosure. In addition, the terms "first" and "second" are used only for distinguishing different descriptions, and have no special meaning.

The present disclosure provides a loudspeaker module. The loudspeaker module is capable of having both loudspeaker function and vibration motor function, which facilitates the miniaturization of an electronic device using the loudspeaker module.

Figure 2:
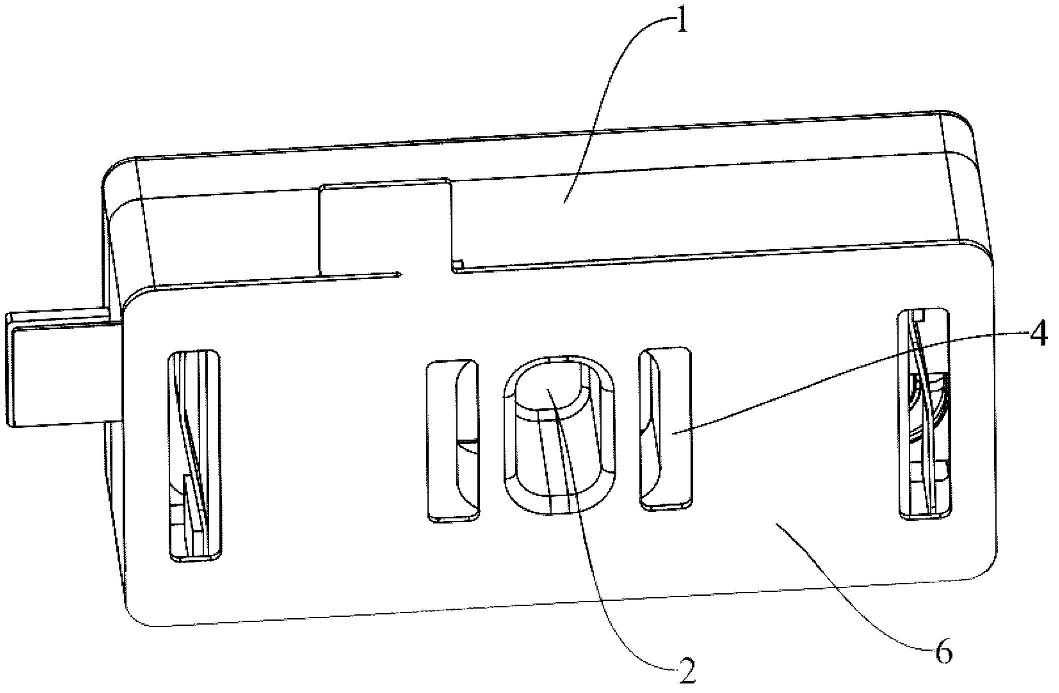
FIG. 2 is a structural diagram of a loudspeaker module according to an embodiment of the present disclosure from a second perspective.

As shown in FIG. 1 and FIG. 2, the loudspeaker module includes a housing 1, a connection assembly 2, a sound generating unit 3, a vibration unit 4, and a magnetic circuit assembly 5.

The vibration unit 4 and the sound generating unit 3 are disposed in the housing 1, where the vibration unit 4 is used for feeding back vibration, and the sound generating unit 3 is used for converting an electrical signal into a sound signal, for example, the sound generating unit 3 may be a loudspeaker. In some embodiments, the vibration unit 4 and the sound generating unit 3 are disposed opposite to each other in the height direction of the housing 1.

The magnetic circuit assembly 5 of this embodiment is disposed between the vibration unit 4 and the sound generating unit 3, and the sound generating unit 3 shares the magnetic circuit assembly 5 with the vibration unit 4. In this embodiment, the sharing means that a magnetic field generated by the magnetic circuit assembly 5 can cooperate with the voice coil 34 in the sound generating unit 3 to realize corresponding functions, and can also cooperate with the motor coil 43 in the vibration unit 4 to realize corresponding functions.

Figure 3:
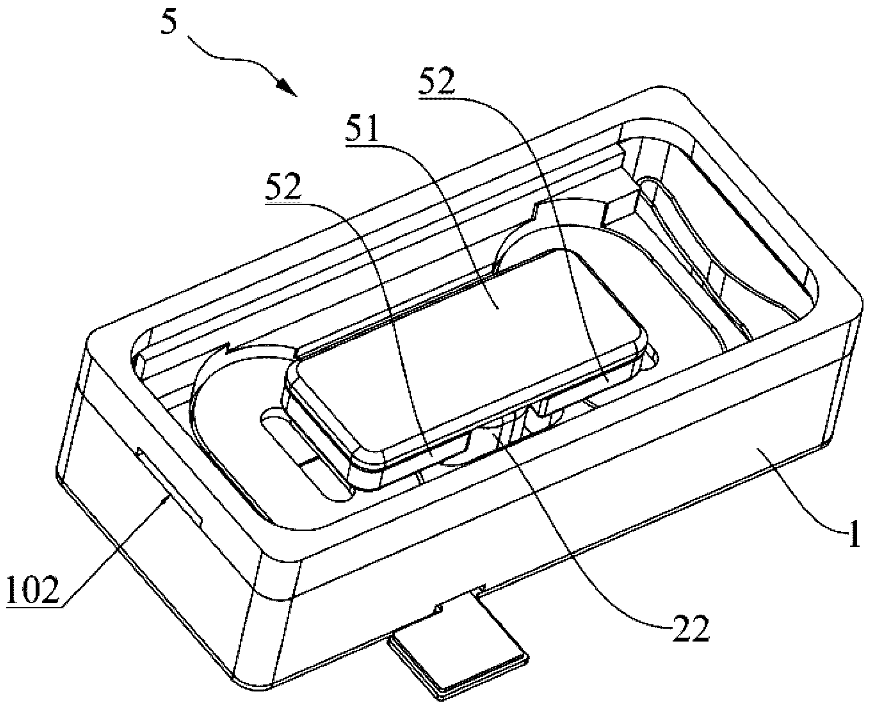
FIG. 3 is an exploded diagram of a loudspeaker module according to an embodiment of the present disclosure.

With reference to FIG. 3, the connection assembly 2 includes a protrusion 22, and one end of the protrusion 22 is connected to the housing 1. The magnetic circuit assembly 5 includes a pole piece 51 and a main magnet 52, and the pole piece 51 is fixedly connected to another end of the protrusion 22 so that the pole piece 51 can be fixed to the housing 1 by means of the protrusion 22. The main magnet 52 is disposed on the pole piece 51, and in some embodiments, the main magnet 52 may be disposed on the pole piece 51 by means of pasting or the like.

That is, the main magnet 52 of the magnetic circuit assembly 5 is sequentially connected to the housing 1 by means of the pole piece 51 and the protrusion 22 of the connection assembly 2 so that the installation of the magnetic circuit assembly 5 is realized. Compared with the mode in which the vibration unit 4 and the sound generating unit 3 are separately provided with the magnetic circuit assembly 5, the vibration unit 4 shares the magnetic circuit assembly 5 with the sound generating unit 3, saving the internal space of the loudspeaker module, and enabling the loudspeaker module to be more miniaturized and to be easy to install in the electronic device with high installation space requirements. In addition, both the vibration unit 4 and the sound generating unit 3 are disposed in the housing, realizing the integrated design of the vibration unit 4 and the sound generating unit 3, and simplifying the assembling steps of the electronic device, thereby making the assembly of the loudspeaker module in the electronic device simpler and efficient. In addition, in the present disclosure, the main magnet 52 is disposed on the pole piece 51 so that the magnetic circuit assembly 5 is connected to the housing 1 by means of the pole piece 51. That is, the pole piece 51 also functions to install the magnetic circuit assembly 5.

In this embodiment of the present disclosure, the protrusion 22 of the connection assembly 2 is connected to the pole piece 51, and the main magnet 52 is disposed below the pole piece 51, that is, the protrusion 22 is disposed at the periphery of the main magnet 52, and the height of the loudspeaker module does not increase with a boss so that the installation reliability of the magnetic circuit assembly 5 is improved by providing the connection assembly 2, the thickness of the loudspeaker module is not increased, and the space utilization rate of the inner cavity of the housing 1 is improved, further facilitating the miniaturization of the loudspeaker module.

The loudspeaker module of this embodiment of the present disclosure is further described below by means of specific embodiments.

Figure 4:
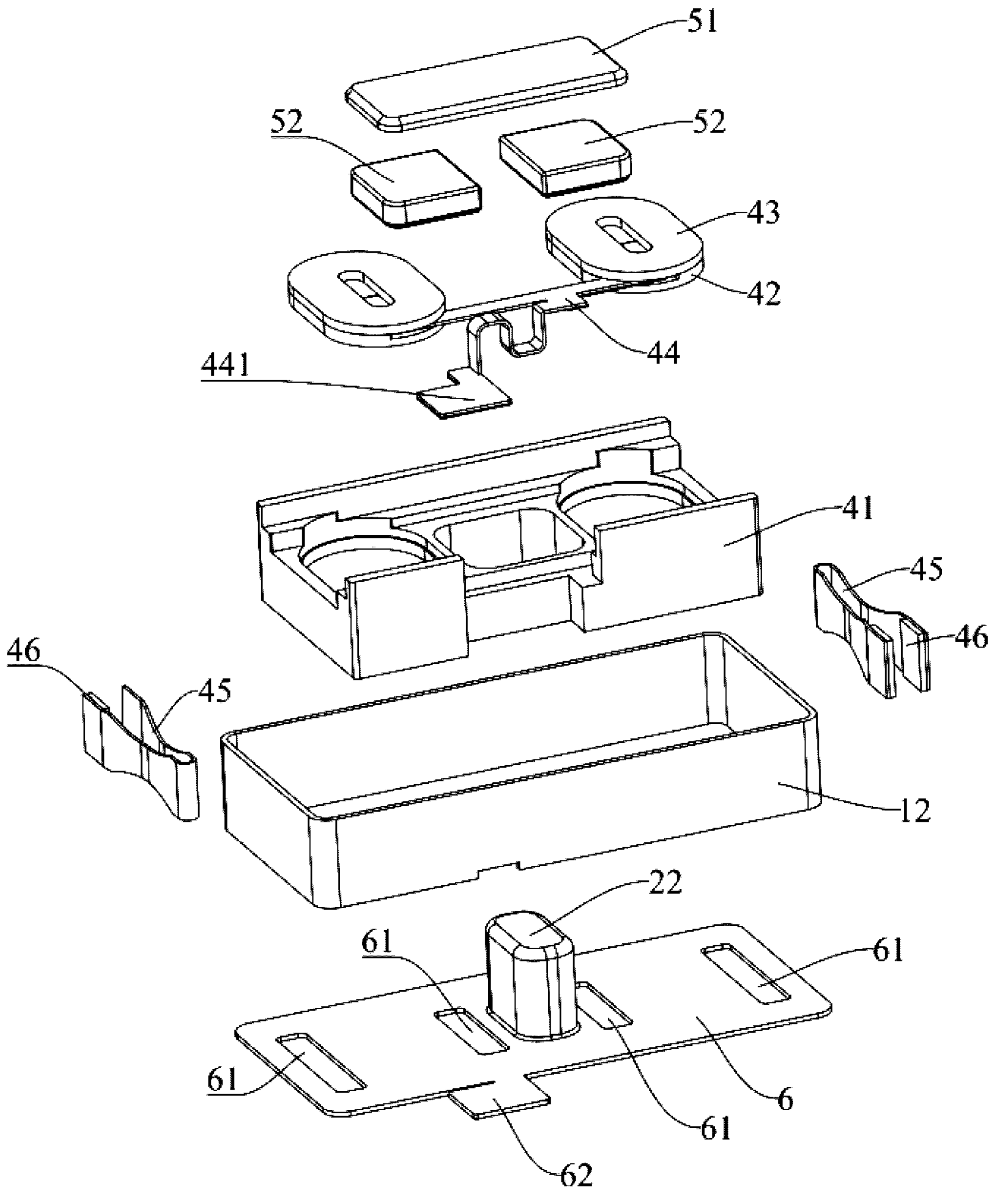
FIG. 4 is an exploded diagram of a vibration unit of a loudspeaker module according to an embodiment of the present disclosure.

In an embodiment of the present disclosure, as shown in FIG. 4, the loudspeaker module further includes a bottom plate 6. The bottom plate 6 is disposed at the bottom of the housing 1, and in some embodiments, the bottom plate 6 is connected to the bottom of the housing 1. The protrusion 22 forms a boss, one end of the boss (corresponding to the lower part of FIG. 4) is connected to the bottom plate 6, and another end of the boss (corresponding to the upper part of FIG. 4) extends toward the magnetic circuit assembly 5 and is connected to the pole piece 51. That is, the boss is disposed on the bottom plate 6 so that the magnetic circuit assembly 5 is connected to the bottom plate 6 and the housing 1 by means of the pole piece 51 and the boss, thereby realizing the installation of the magnetic circuit assembly 5.

Specifically, for example, the boss and the bottom plate 6 may be connected by laser welding or the like. The boss may also be manufactured and formed, for example, by the bottom plate 6 through a stamping process, that is, the boss and the bottom plate 6 are integrally formed so that the boss and the bottom plate 6 have high connection strength, the boss formed by stamping may be, for example, a hollow structure, the weight of the loudspeaker module is small, and the weight of the loudspeaker module is light. Of course, it can be understood that the boss or protrusion 22 not formed by stamping may also be a hollow structure, which is not limited of this embodiment. Alternatively, with reference to FIG. 4, the bottom plate 6 has a plurality of heat dissipation holes 61 for heat dissipation of the loudspeaker module.

Figure 9:
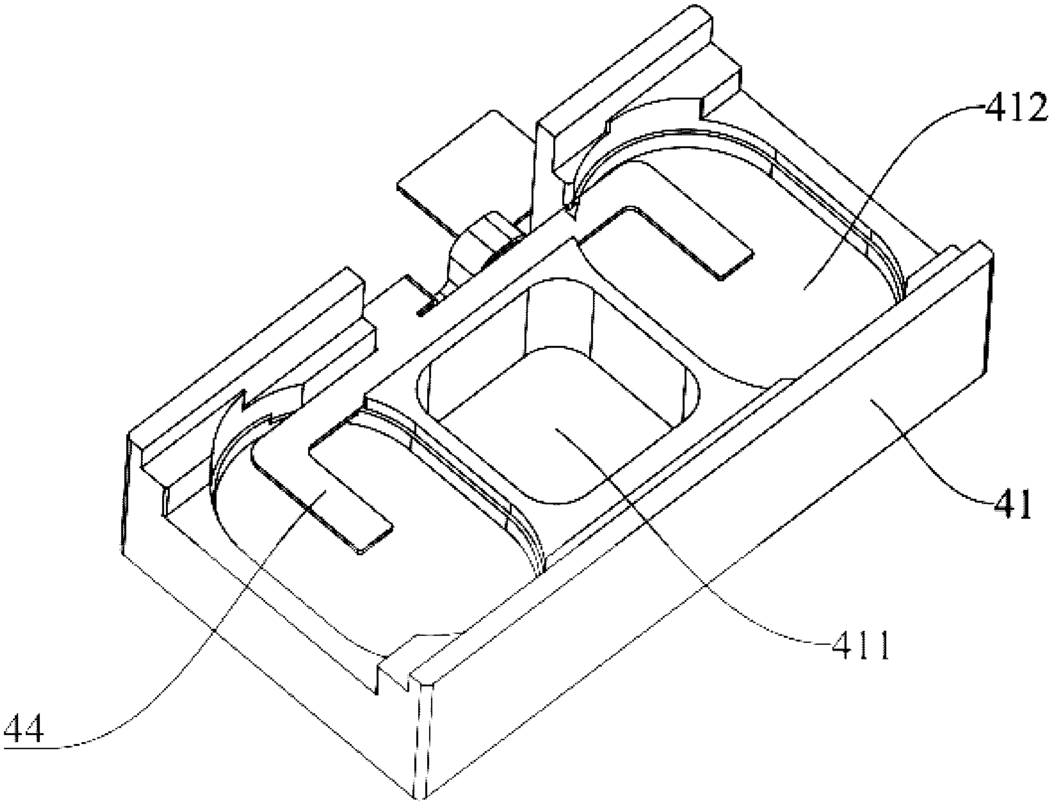
FIG. 9 is a structural diagram of a counterweight according to an embodiment of the present disclosure.
Figure 10:
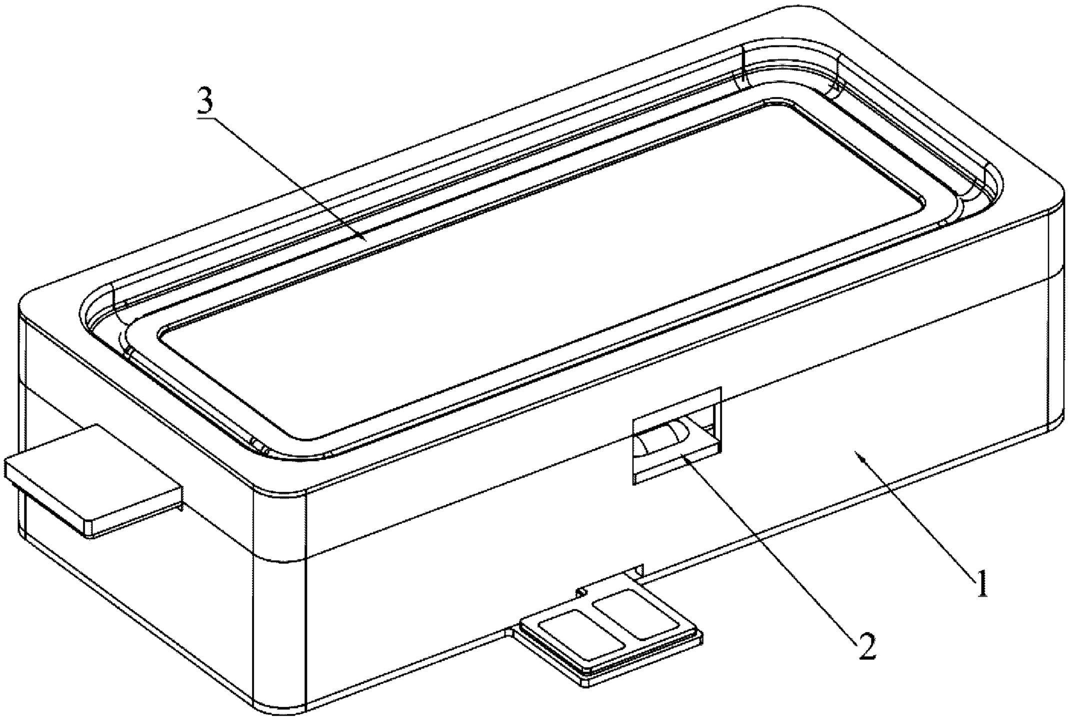
FIG. 10 is a structural diagram of another loudspeaker module according to an embodiment of the present disclosure from a first perspective.

Further alternatively, the vibration unit 4 may be disposed on a side close to the bottom plate 6 or on a side far from the bottom plate 6, which is not specifically limited herein. In a specific embodiment of this embodiment, the vibration unit 4 is disposed above the bottom plate 6, and since another end of the boss connected to the bottom plate 6 needs to be connected to the pole piece 51 of the magnetic circuit assembly 5, a through hole allowing the boss to pass through is required to be provided on the vibration unit 4. Specifically, as shown in FIG. 4 and FIG. 9, the vibration unit 4 includes a counterweight 41, the counterweight 41 has a first through hole 411, and the first through hole 411 is disposed through the counterweight 41 along the height direction of the housing 1 (corresponding to the vertical direction of FIG. 9). The main magnet 52 has a clearance through which the boss passes, and another end of the boss sequentially passes through the first through hole 411 and the clearance and is connected to the pole piece 51. In this embodiment of the present disclosure, the boss sequentially passes through the inner cavity of the housing 1 and the clearance of the main magnet 52, and is connected to the pole piece 51 of the magnetic circuit assembly 5, that is, the boss does not additionally occupy the inner space of the housing 1. In the loudspeaker module of this embodiment of the present disclosure, the installation reliability of the magnetic circuit assembly 5 is improved by providing the connection assembly 2, the thickness of the loudspeaker module is not increased, and the space utilization rate of the inner cavity of the housing 1 is improved, further facilitating the miniaturization of the loudspeaker module.

It should be noted that the aperture of the first through hole 411 is larger than the cross-sectional dimension of the boss so that the counterweight 41 has a movable space and interference from the boss on the counterweight 41 is avoided. The counterweight 41 is supported on the bottom plate 6. Alternatively, the counterweight 41 is made of tungsten steel.

In a specific embodiment of the present disclosure, for example, one main magnet 52 may be provided, the main magnet 52 has a second through hole, and the cross section of the main magnet 52 may be annular, U-shaped, horseshoe-shaped, or the like, which is based on the consideration that the main magnet 52 of the annular, U-shaped, or horseshoe-shaped may form a clearance allowing the boss to pass through.

Figure 7:
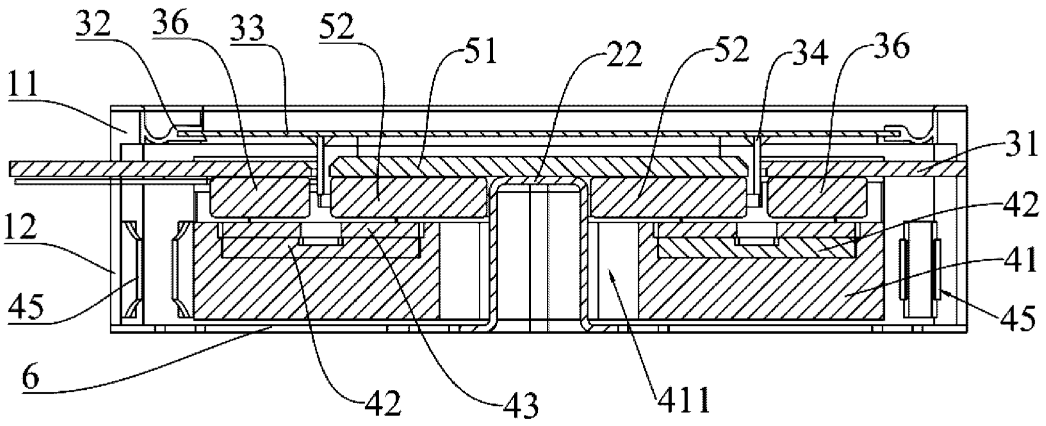
FIG. 7 is a cross-sectional view of view C-C of the view shown in FIG. 6 of the present disclosure.

In another specific embodiment of the present disclosure, for example, at least one pair of main magnets 52 are disposed on two sides of the boss, where main magnets 52 in each pair of the at least one pair of main magnets 52 are spaced apart so that a clearance is formed. More specifically, as shown in FIG. 4 and FIG. 7, for example, even number of the main magnets 52 may be provided, and the even number of the main magnets 52 are symmetrically disposed on two sides of the boss. This symmetrical arrangement of the main magnets 52 ensures the force balance of the magnetic circuit assembly 5, and can prevent the deflection and skew of the magnetic circuit assembly 5 from affecting the sound quality of the sound generating unit 3 and the vibration of the vibration unit 4.

Figure 13:
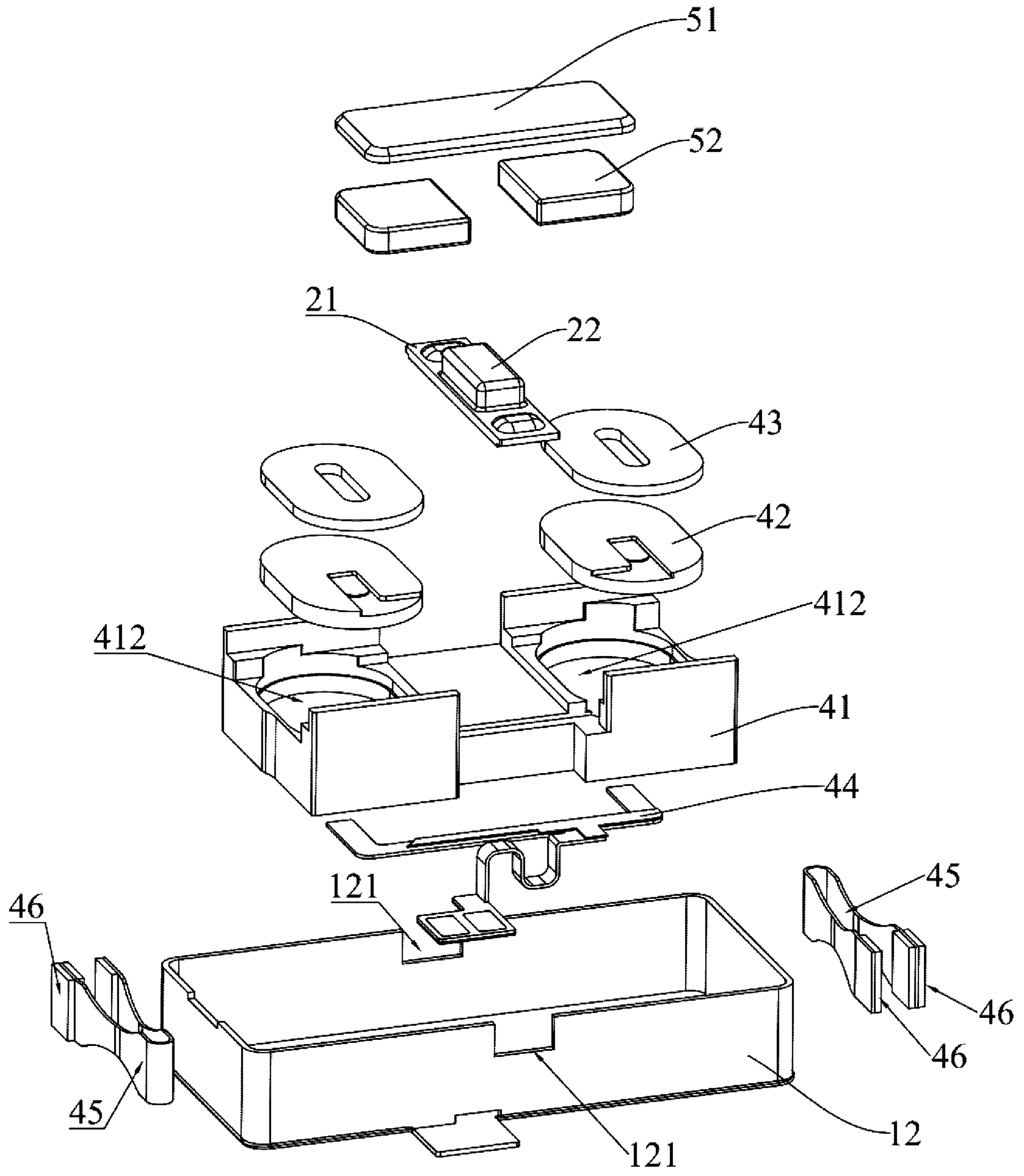
FIG. 13 is an exploded diagram of a vibration unit of another loudspeaker module according to an embodiment of the present disclosure.
Figure 14:
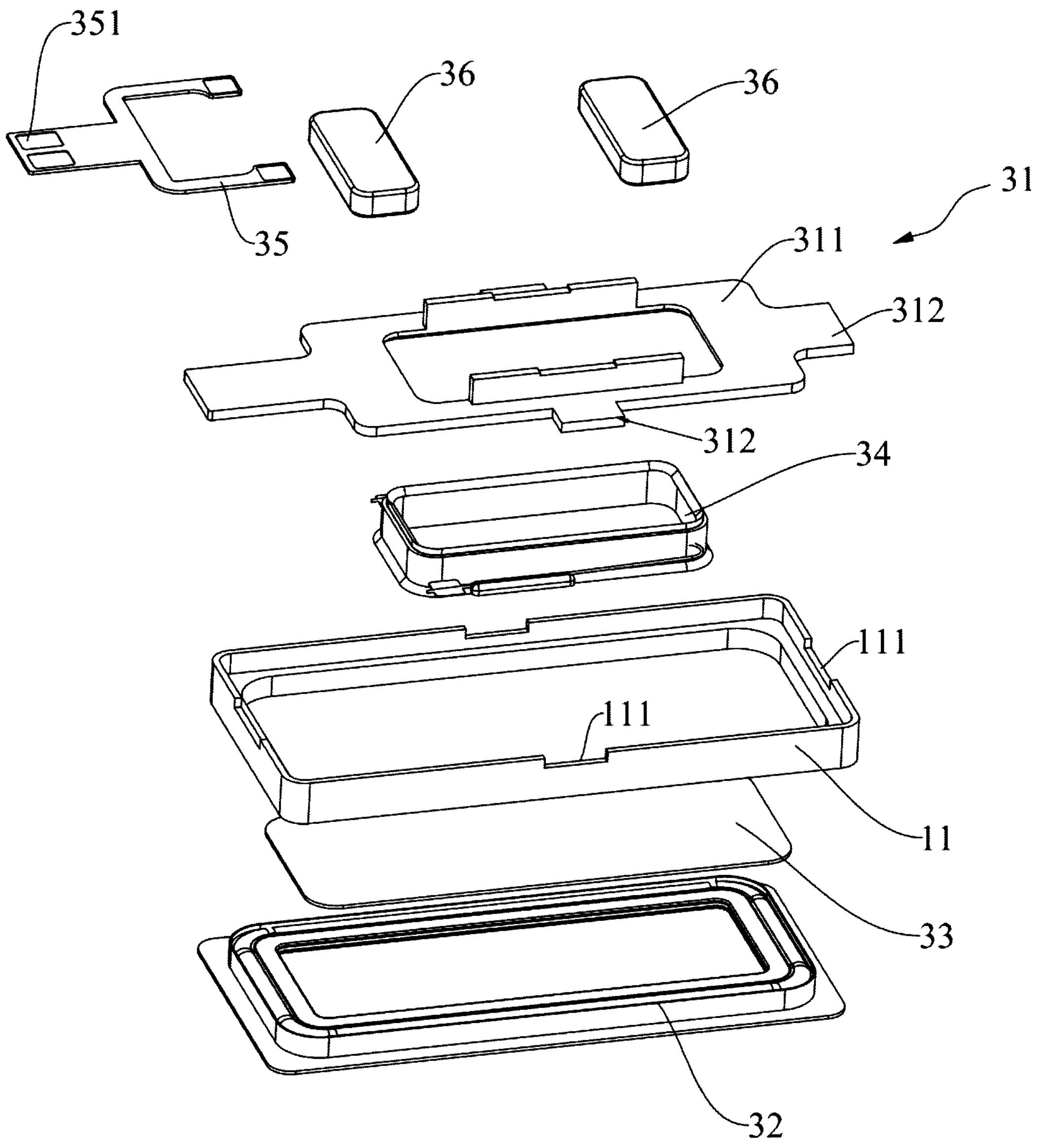
FIG. 14 is an exploded diagram of a sound generating unit of another loudspeaker module according to an embodiment of the present disclosure.
Figure 15:
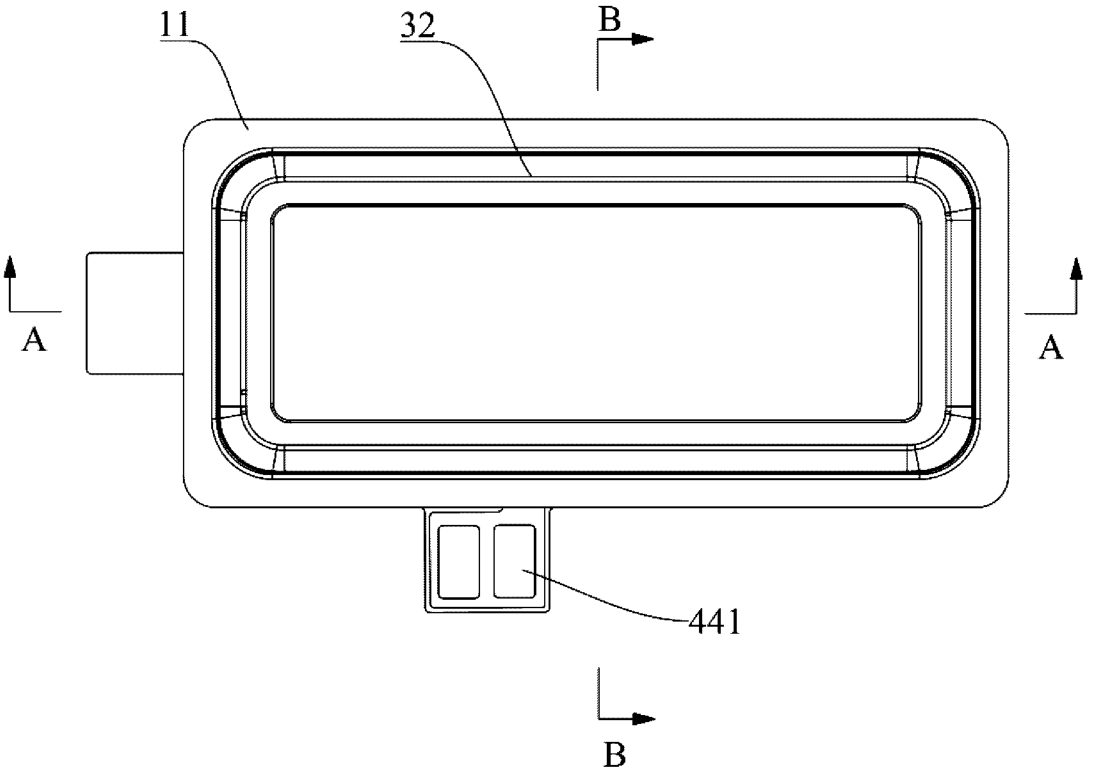
FIG. 15 is a top view of another loudspeaker module according to an embodiment of the present disclosure.
Figure 16:
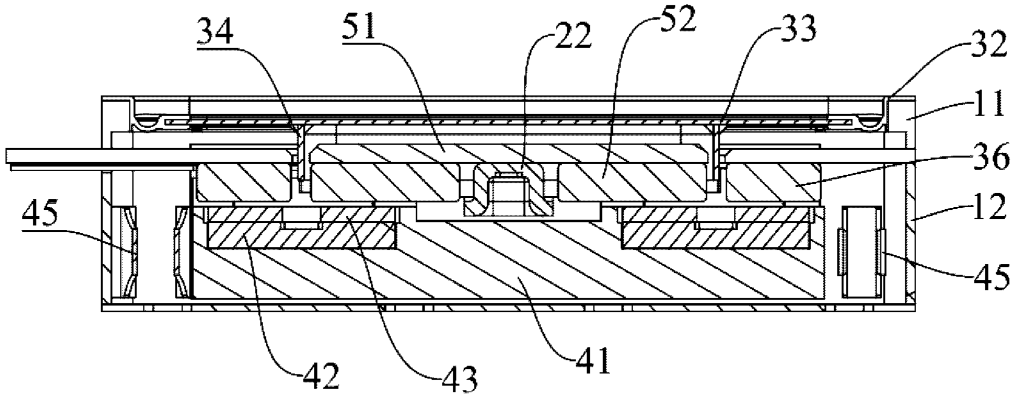
FIG. 16 is a cross-sectional view of view A-A of the view shown in FIG. 15 of the present disclosure.
Figure 17:
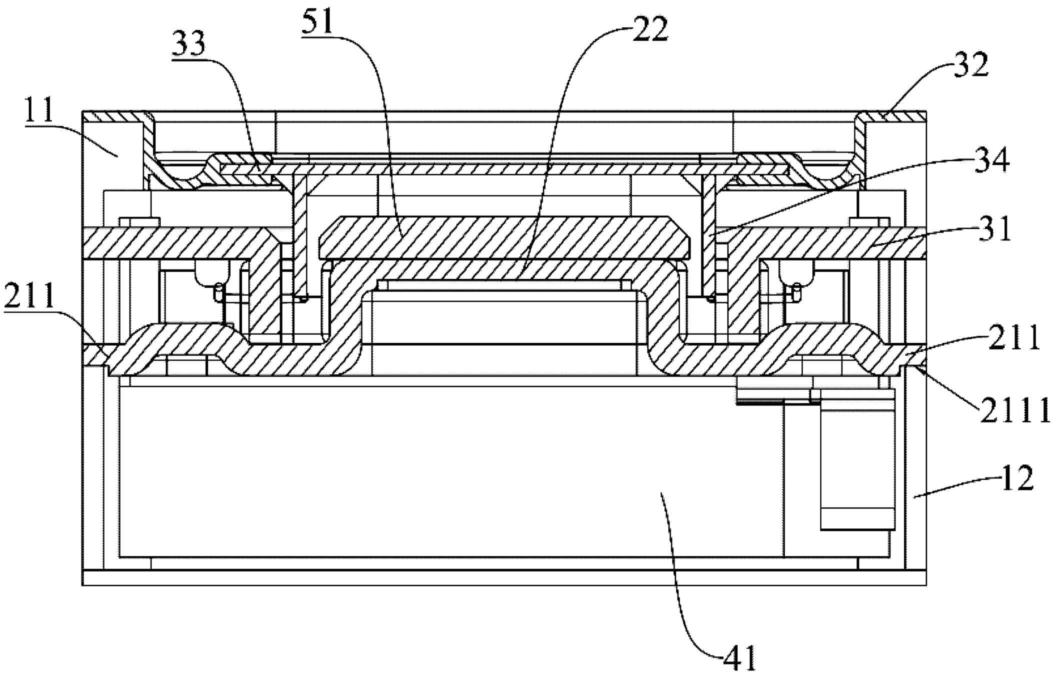
FIG. 17 is a cross-sectional view of view B-B of the view shown in FIG. 15 of the present disclosure.
Figure 18:
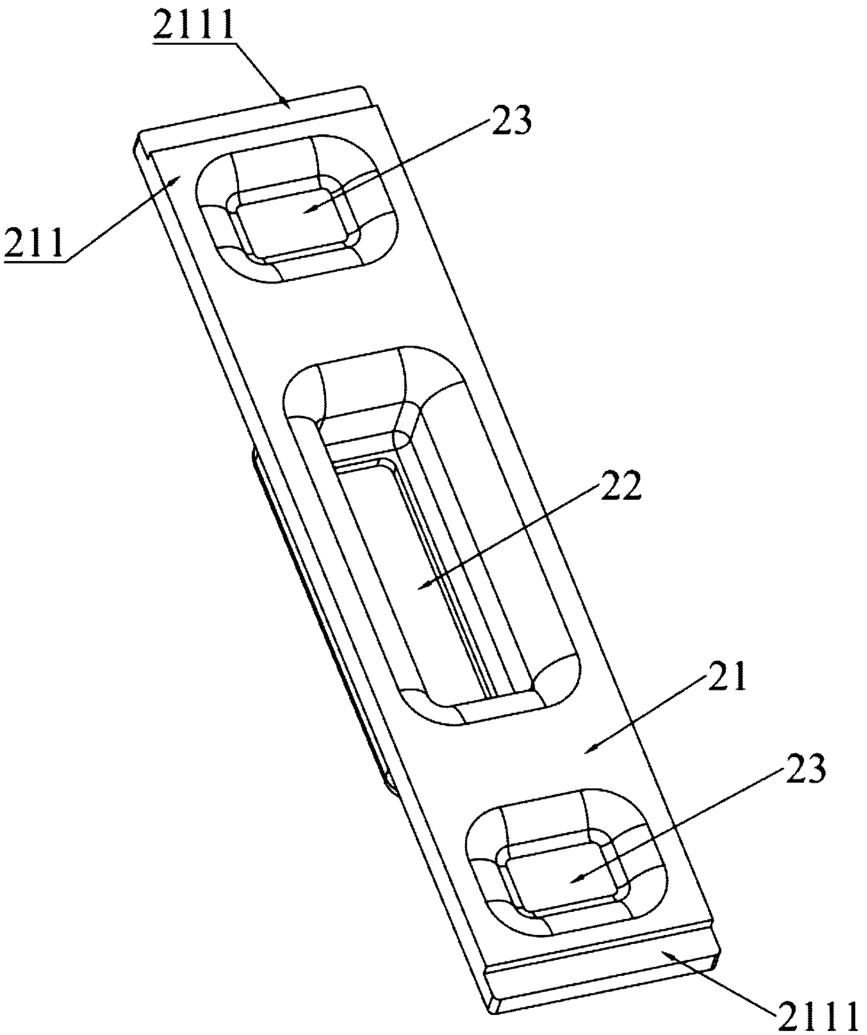
FIG. 18 is a structural diagram of a connection assembly according to an embodiment of the present disclosure.
Figure 19:
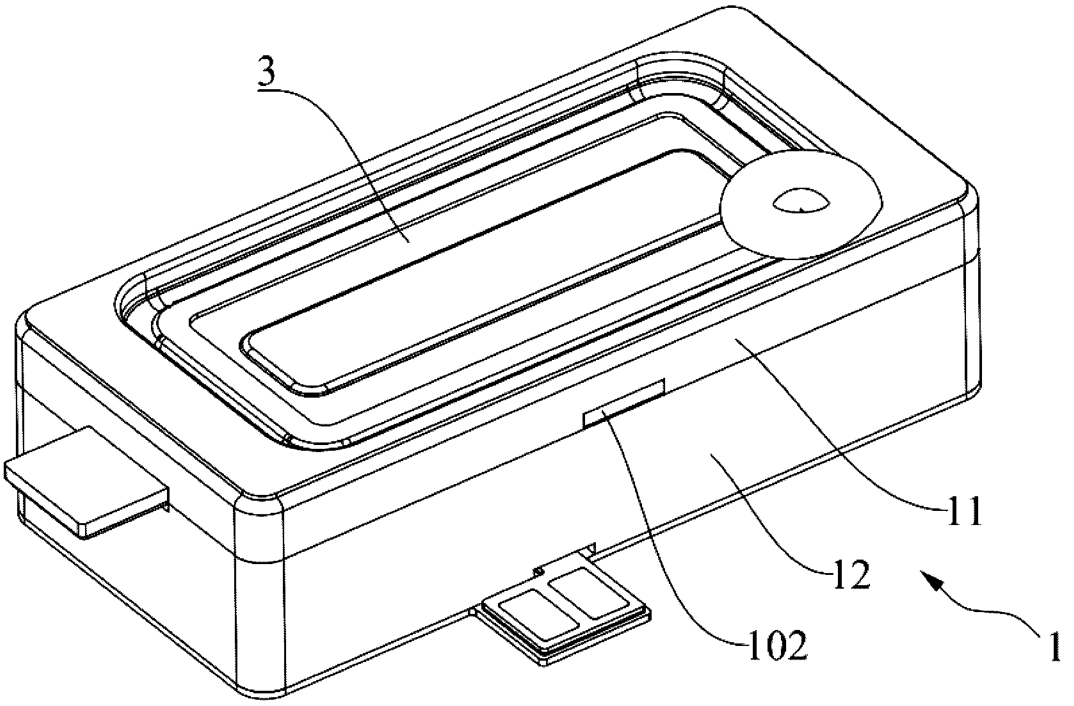
FIG. 19 is a structural diagram of still another loudspeaker module according to an embodiment of the present disclosure.
Figure 20:
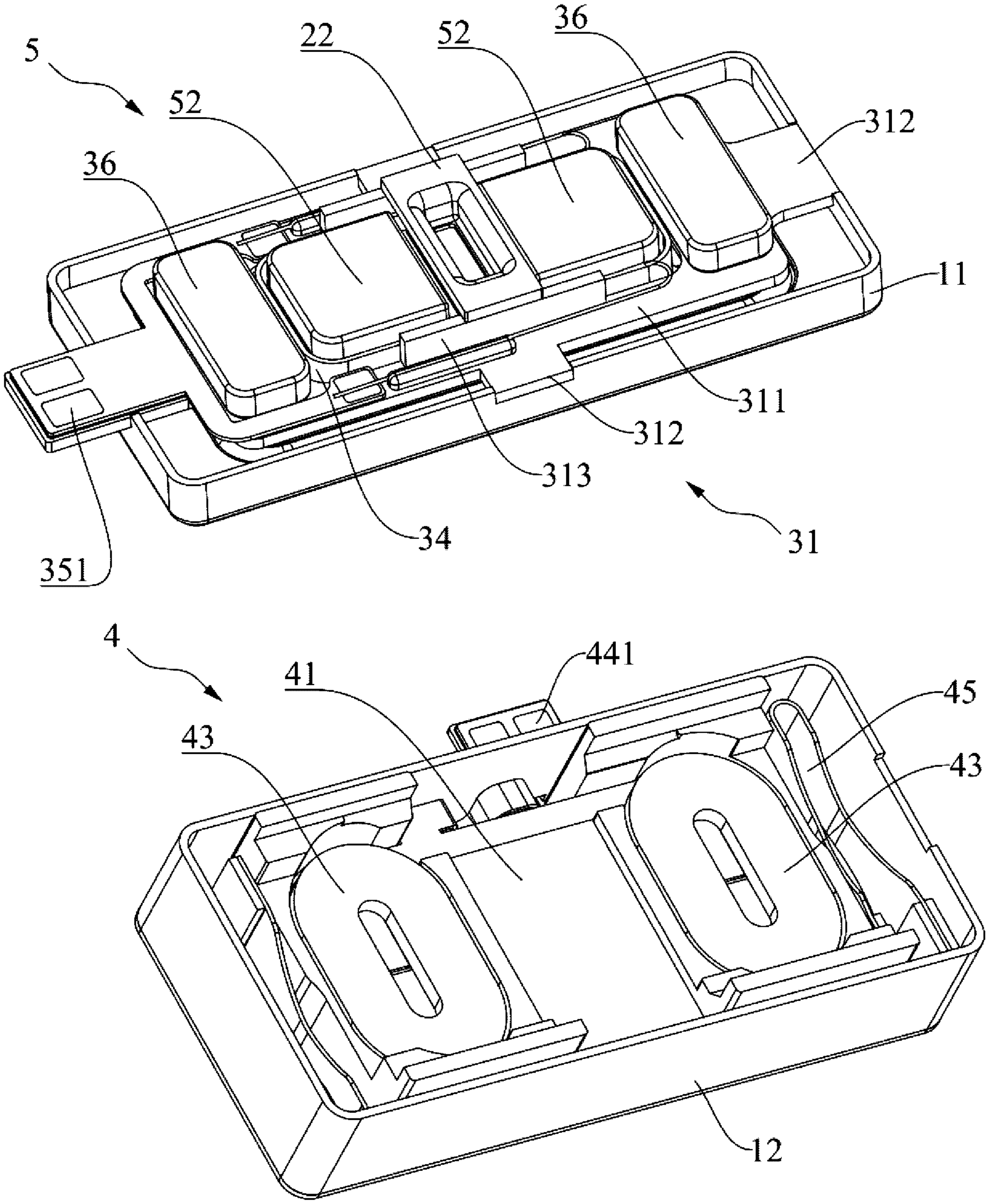
FIG. 20 is an exploded diagram of still another loudspeaker module according to an embodiment of the present disclosure.
Figure 21:
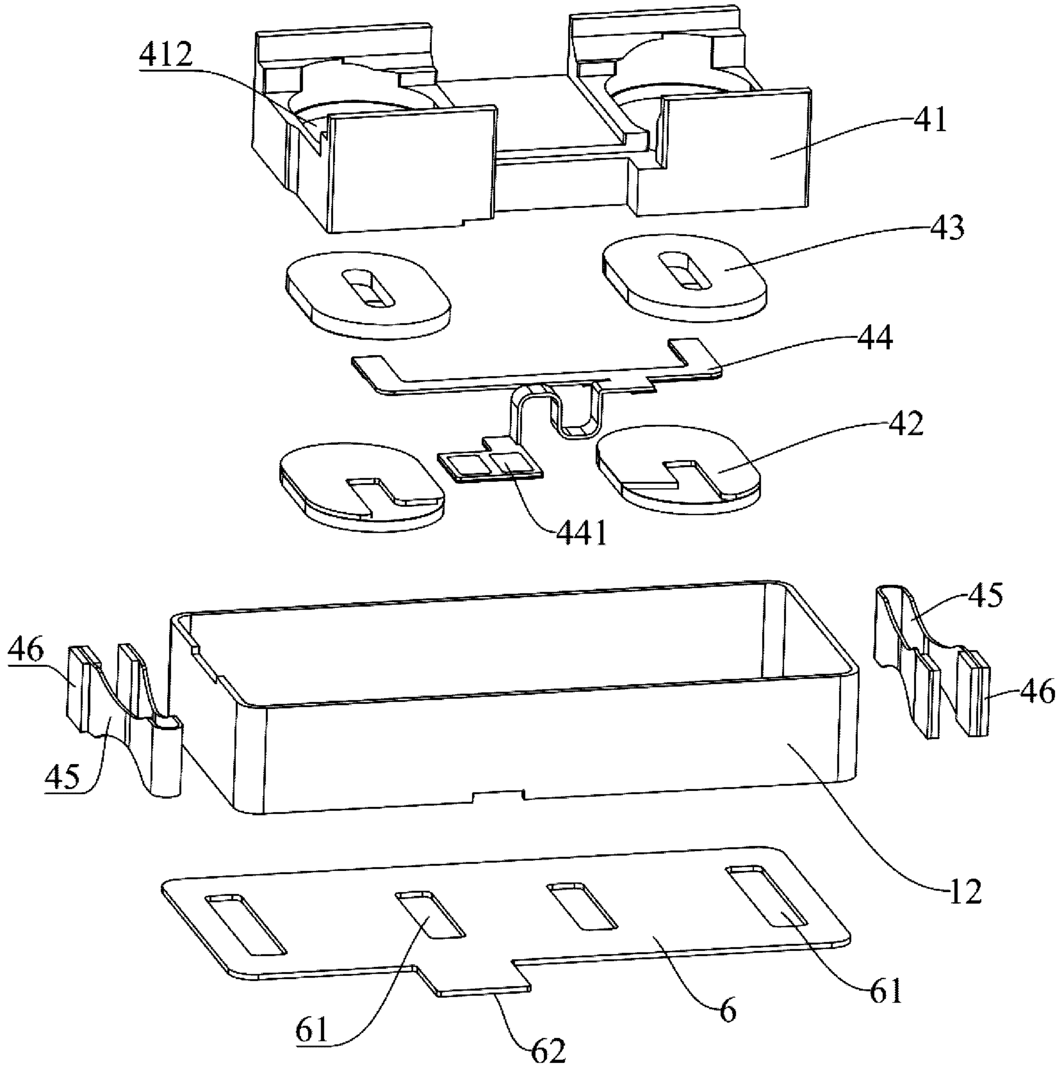
FIG. 21 is an exploded diagram of a vibration unit of still another loudspeaker module according to an embodiment of the present disclosure.

In another embodiment of the present disclosure, as shown in FIG. 10 to FIG. 18, the connection assembly 2 may further include, for example, a base plate 21. The base plate 21 is connected to one end of the protrusion 22, and has two outwardly extending connection arms 211. In this embodiment, as shown in FIG. 13 and FIG. 18, the connection assembly 2 forms a T-shaped member, and the base plate 21 extends along its own length direction (corresponding to the vertical direction of FIG. 18) to form two connection arms 211. Two ends the two connection arms 211 are respectively connected to two opposite side plates of the housing 1 so that the protrusion 22 is connected to the housing 1 by means of the connection arms 211. That is, the protrusion 22 of the connection assembly 2 is connected to the housing 1 by means of a base plate 21 integrated with the protrusion 22, and the protrusion 22 of the connection assembly 2 may be, for example, vertically connected to the pole piece 51 to form an I-shaped structure. The main magnet 52 of the magnetic circuit assembly 5 is sequentially connected to a side plate of the housing 1 by means of the pole piece 51, the protrusion 22 of the connection assembly 2, and the base plate 21 so that the installing of the magnetic circuit assembly 5 is realized. In this embodiment of the present disclosure, the connection assembly 2 is provided so that the installation of the magnetic circuit assembly 5 is realized without changing the internal components of the vibration unit 4 or the sound generating unit 3, thereby improving the production efficiency and reducing the production cost. Specifically, FIG. 18 is a structural diagram of a connection assembly 2 of this embodiment. As shown in FIG. 18, a protrusion 22 of the connection assembly 2 of this embodiment of the present disclosure may be, for example, stamped and formed based on a base plate 21, and has the advantages of simple forming process and high connection strength.

In an embodiment of the present disclosure, a positioning hole is disposed in the housing 1 and the base plate 21 of the connection assembly 2 is connected to the positioning hole of the housing 1 so that the thickness of the loudspeaker module does not increase with the base plate 21. The protrusion 22 is connected to the pole piece 51 of the magnetic circuit assembly 5, and the protrusion 22 is disposed between two main magnets 52 so that the thickness of the loudspeaker module also does not increase with the protrusion 22. That is, although the connection assembly 2 having the base plate 21 and the protrusion 22 is provided in this embodiment of the present disclosure, the thickness of the loudspeaker module does not increase with the connection assembly 2. That is, in the loudspeaker module of this embodiment of the present disclosure, the installation reliability of the magnetic circuit assembly 5 is improved by providing the connection assembly 2, the thickness of the loudspeaker module is not increased, and the space utilization rate of the inner cavity of the housing 1 is improved, further facilitating the miniaturization of the loudspeaker module.

It should be noted that considering that the main magnet 52 is connected to the pole piece 51, the connection arms 211 of the base plate 21 need to be connected to the side plates of the housing 1, and the symmetrical arrangement of the magnets can ensure the force balance of the magnetic circuit assembly 5, at least two main magnets 52 of this embodiment are provided, and the at least two main magnets 52 are respectively disposed on the pole piece 51 on two sides of the protrusion 22 so that the main magnet 52 and the connection assembly 2 do not interfere with each other. Preferably, even number of main magnets 52 may be provided.

Figure 11:
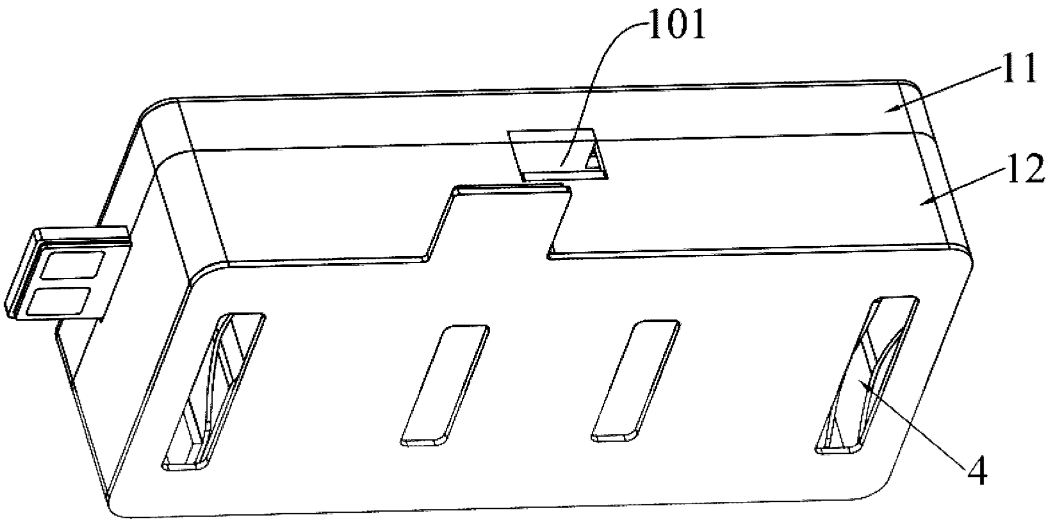
FIG. 11 is a structural diagram of another loudspeaker module according to an embodiment of the present disclosure from a second perspective.
Figure 12:
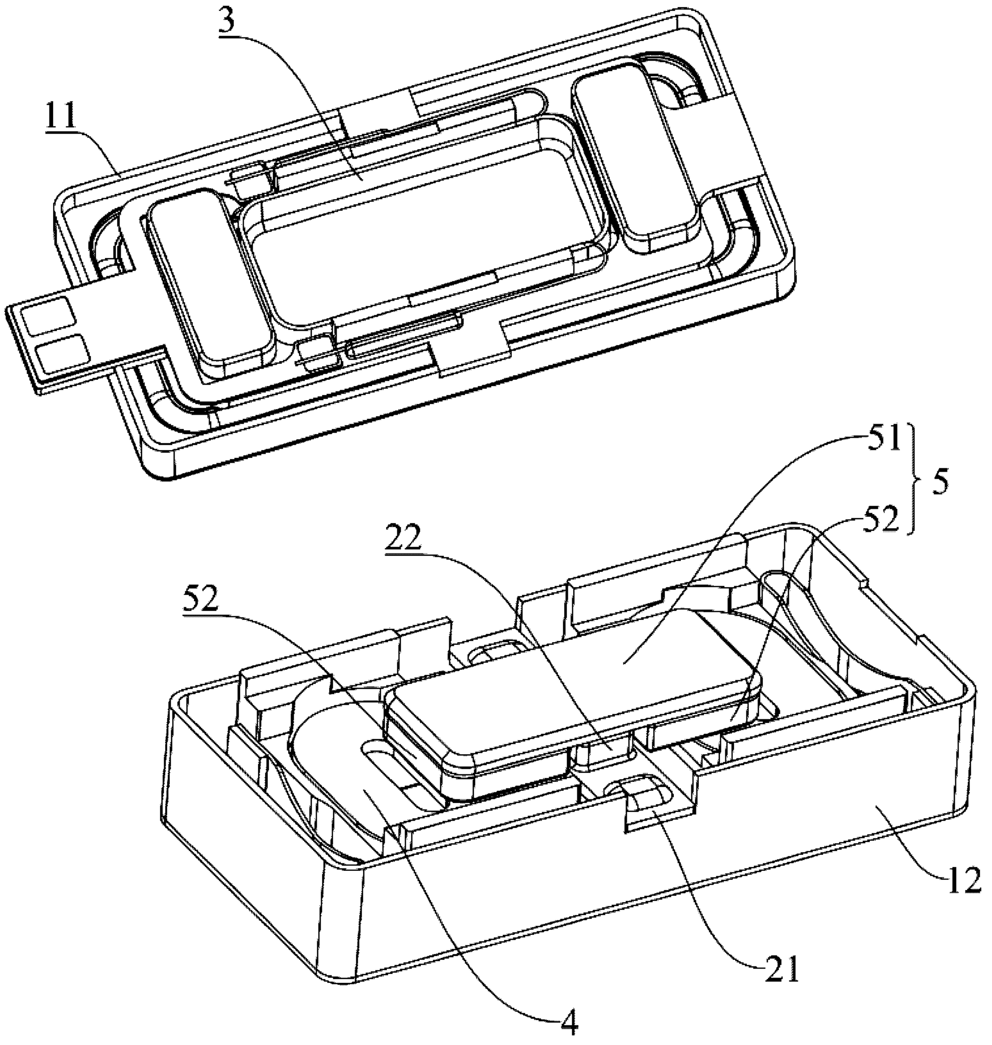
FIG. 12 is an exploded diagram of another loudspeaker module according to an embodiment of the present disclosure.

In a specific embodiment of the present disclosure, as shown in FIG. 11, first positioning holes 101 cooperating with the corresponding connection arms 211 are formed in the housing 1, and each of the corresponding connection arms 211 is disposed in a respective one of the first positioning holes 101. That is, the main magnet 52 of the magnetic circuit assembly 5 is directly connected to two opposite side plates of the housing 1 by means of the pole piece 51, the protrusion 22 of the connection assembly 2, the base plate 21 of the connection assembly 2, and the connection arms 211. This connection mode has the advantage of a simple structure. The base plate 21 of the connection assembly 2 of this embodiment of the present disclosure is connected to the first positioning holes 101 and the thickness of the loudspeaker module does not increase with the base plate 21. The protrusion 22 is connected to the pole piece 51 of the magnetic circuit assembly 5, and the protrusion 22 is disposed between the two main magnets 52. Therefore, the thickness of the loudspeaker module also does not increase with the protrusion 22. That is, although the connection assembly 2 having the base plate 21 and the protrusion 22 is provided in this embodiment of the present disclosure, the thickness of the loudspeaker module does not increase with the connection assembly 2, facilitating the miniaturization of the loudspeaker module and improving the reliability of the loudspeaker module.

It should be noted that two first positioning holes 101 are provided, the two first positioning holes 101 are in one-to-one correspondence with the two connection arms 211, and each of the corresponding connection arms 211 is disposed in a respective one of the first positioning holes 101. The two first positioning holes 101 are respectively disposed on the two opposite side plates of the housing 1, the two first positioning holes 101 should be disposed at the same horizontal height, and the height of the two first positioning holes 101 with respect to the bottom or the top of the housing 1 is determined by the assembly positions of the sound generating unit 3 and the vibration unit 4, that is, the position of the first positioning holes 101 should meet the requirement that the magnetic circuit assembly 5 is disposed between the sound generating unit 3 and the vibration unit 4.

Alternatively, with reference to FIG. 18, for example, the base plate 21 may form a cushion protrusion 23 by stamping, the height of the cushion protrusion 23 is lower than the height of the protrusion 22, and is used for force damping of the connection assembly 2. In addition, as shown in FIG. 18, an end of the connection arm 211 is further provided with a lapping structure 2111. The lapping structure 2111 may be specifically an L-shaped groove, and the lapping structure 2111 is used for being connected to the housing 1. Specifically, as shown in FIG. 17, one groove wall of the L-shaped groove is in contact with a hole wall of the first positioning hole 101, and the other groove wall of the L-shaped groove is in contact with the inner wall of the housing 1. The housing 1 can provide a supporting force to the connection arm 211 in the length direction of the connection assembly 2, thereby further improving the connection strength between the housing 1 and the connection arm 211.

The first positioning hole 101 may be any of the following, and the first positioning hole 101 will be detailly described below.

Alternatively, for example, the housing 1 may be an integrated box structure with openings at two ends of the housing, and the aperture of the first positioning hole 101 is larger than the longitudinal cross-sectional dimension of the connection assembly 2 so that the connection assembly 2 may be inserted into the housing 1 by one first positioning hole 101 until the two connection arms 211 are respectively located in the two first positioning holes 101, and then the two connection arms 211 are connected to the housing 1 by welding or other fixing means.

Alternatively, different from the preceding integrated box structure, the housing 1 may include, for example, a first housing 11 and a second housing 12 connected to the first housing 11. One of the vibration unit 4 or the sound generating unit 3 is disposed in the first housing 11, and another of the vibration unit 4 or the sound generating unit 3 is disposed in the second housing 12, which is not specifically limited herein. In this embodiment, the sound generating unit 3 is disposed in the first housing 11, and the vibration unit 4 is disposed in the second housing 12. The first positioning hole 101 may be formed in a variety of ways. The present embodiment provides the following embodiments.

In the first forming mode of the first positioning hole 101, the first housing 11 has a first notch facing the second housing 12, and the first notch and an end surface of the second housing 12 form a corresponding first positioning hole 101, that is, the edge of the second housing 12 circles the first notch of the first housing 11 to form a corresponding first positioning hole 101.

In the second forming mode of the first positioning hole 101, the second housing 12 has a second notch facing the first housing 11, and the second notch and an end surface of the first housing 11 form a corresponding first positioning hole 101, that is, the edge of the first housing 11 circles the second notch of the second housing 12 to form a corresponding first positioning hole 101.

In the third forming mode of the first positioning hole 101, a third notch corresponding to a connection arm 211 of the connection arms 211 is disposed on the first housing 11, as shown in FIG. 13, a fourth notch 121 corresponding to the third notch is disposed on the second housing 12, and the fourth notch 121 and the third notch cooperate to form a corresponding first positioning hole 101, that is, the first housing 11 and the second housing 12 cooperate with each other to form the corresponding first positioning hole 101.

In the fourth forming mode of the first positioning hole 101, a first positioning hole 101 is directly formed in a side wall of the first housing 11.

In the fifth forming mode of the first positioning hole 101, a first positioning hole 101 is directly formed in a side wall of the second housing 12.

It should be noted that the first positioning hole 101 may be formed according to actual needs, for example, one of the above forming modes may be selected according to the positions of the components in the housing 1.

Figure 26:
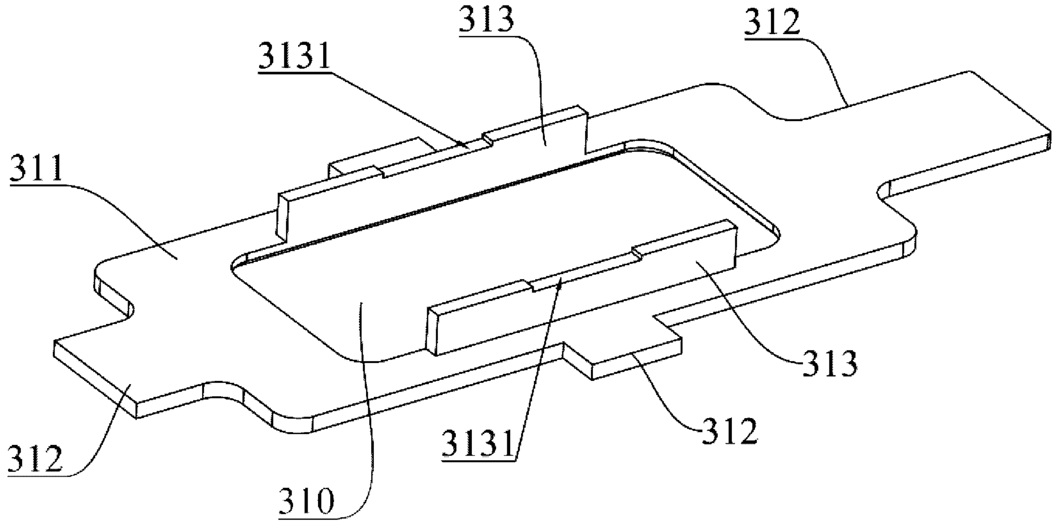
FIG. 26 is a schematic structural diagram of a first magnetic guide according to an embodiment of the present disclosure.

In another specific embodiment of this embodiment of the present disclosure, as shown in FIG. 19 to FIG. 26, a sound generating unit 3 includes a first magnetic guide 31, the first magnetic guide member 31 includes a magnetic guide body 311, an edge of the magnetic guide body 311 extends outwardly to form a plurality of cantilever arms 312, a second positioning hole 102 corresponding to a cantilever arm 312 of the plurality of cantilever arms 312 is formed in the housing 1, and the cantilever arm 312 is disposed in a corresponding second positioning hole 102. That is, the base plate 21 of the connection assembly 2 may also be, for example, connected to the housing 1 by means of the first magnetic guide 31, and the corresponding second positioning hole 102 is disposed on the housing 1 to limit the cantilever arm 312 so that the magnetic guide member body 311 is connected to the housing. Illustratively, the magnetic guide body 311 may be square-shaped, and four sides of the magnetic guide body 311 all extend outwardly to form the cantilever arms 312, so as to further improve the stability of fixing the first magnetic guide 31 to the housing 1. Two support arms 313 extending toward the base plate 21 are formed on the magnetic guide body 311, and the two supporting arms 313 are in one-to-one correspondence with the two connection arms 211. As shown in FIG. 26, each of the support arms 313 is provided with a fifth notch 3131 cooperating with a corresponding connection arm 211, and the corresponding connection arm 211 is disposed in the fifth notch 3131. The fifth notch 3131 is provided, facilitating positioning and assembling of the connection arm 211 and the supporting arm 313, and limiting the connection arm 211, thereby improving connection reliability of the connection arm 211 and the supporting arm 313. That is, on the basis that the above-mentioned magnetic circuit assembly 5 is connected to the connection assembly 2 (that is, the main magnet 52 of the magnetic circuit assembly 5 is connected to the protrusion 22 of the connection assembly 2 by means of the pole piece 51), the above-mentioned magnetic circuit assembly 5 is sequentially connected to side plates of the housing 1 by means of the base plate 21 of the connection assembly 2, the connection arms, the support arms 313 connected to the first magnetic guide 31, the magnetic guide body 311, the cantilever arms 312 of the first magnetic guide 31. In short, in this embodiment of the present disclosure, the first magnetic guide assembly 31 is provided so that the magnetic circuit assembly 5 is sequentially connected to the housing 1 by means of the connection assembly 2, the sound generating unit 3 or the vibration unit 4 so that the distance between the magnetic circuit assembly 5 and the sound generating unit 3 or the vibration unit 4 can be reduced, and the magnetic induction strength can be improved. The base plate 21 of the connection assembly 2 of this embodiment of the present disclosure is connected to the second positioning hole 102 of the first magnetic guide 31 so that the thickness of the loudspeaker module does not increase with the base plate 21. The protrusion 22 is connected to the pole piece 51 of the magnetic circuit assembly 5, and the protrusion 22 is disposed between two main magnets 52 so that the thickness of the loudspeaker module also does not increase with the protrusion 22. That is, although the connection assembly 2 having the base plate 21 and the protrusion 22 is provided in this embodiment of the present disclosure, the thickness of the loudspeaker module does not increase with the connection assembly 2, facilitating the miniaturization of the loudspeaker module.

Figure 22:
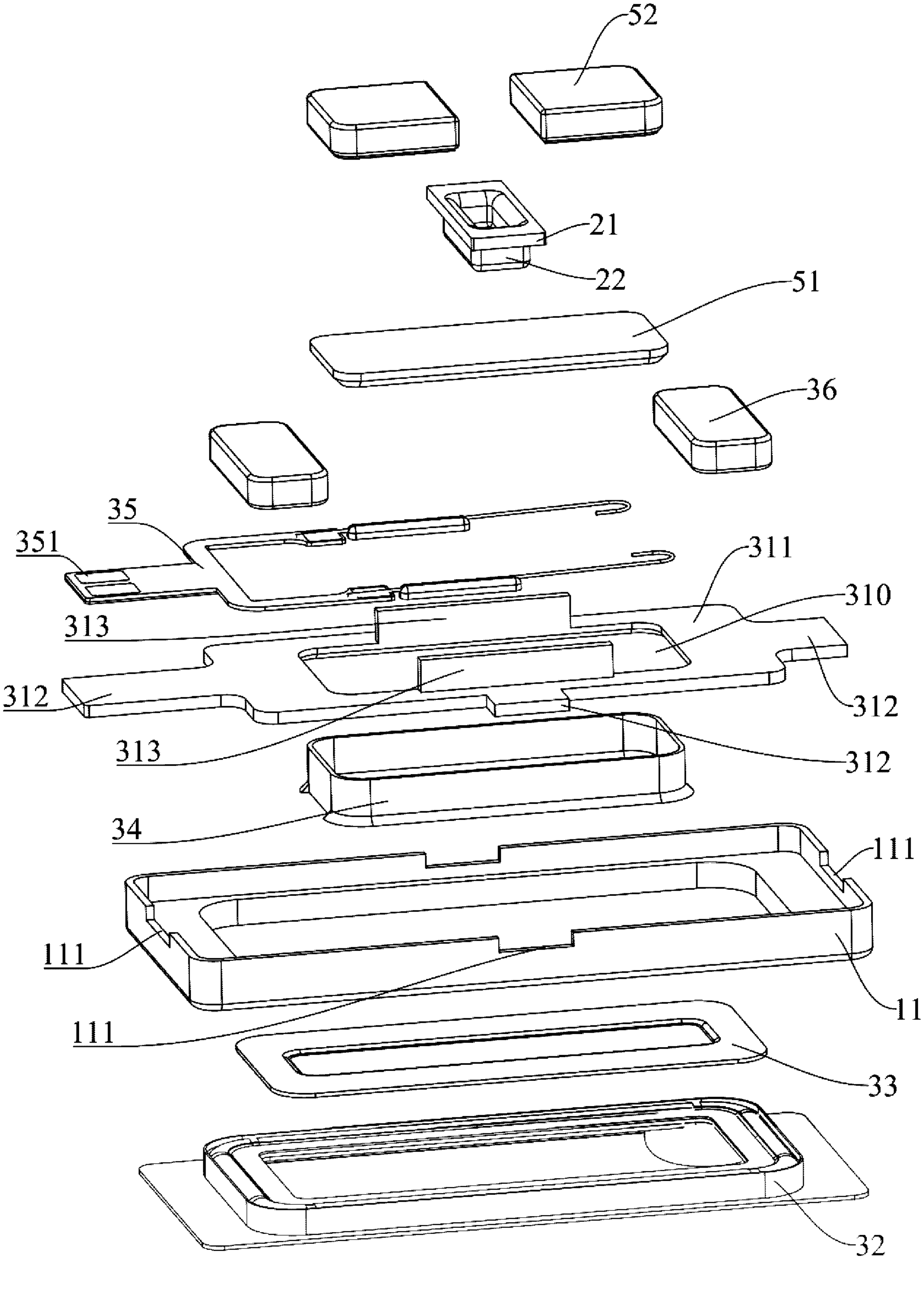
FIG. 22 is an exploded diagram of a sound generating unit of still another loudspeaker module according to an embodiment of the present disclosure.
Figure 23:
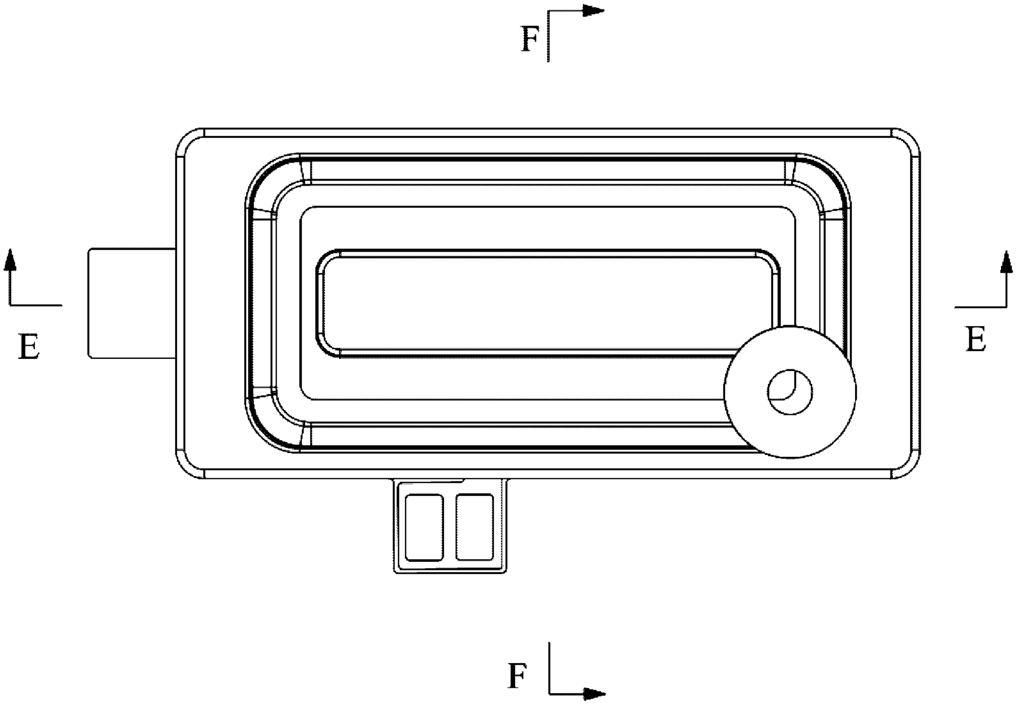
FIG. 23 is a top view of still another loudspeaker module according to an embodiment of the present disclosure.
Figure 24:
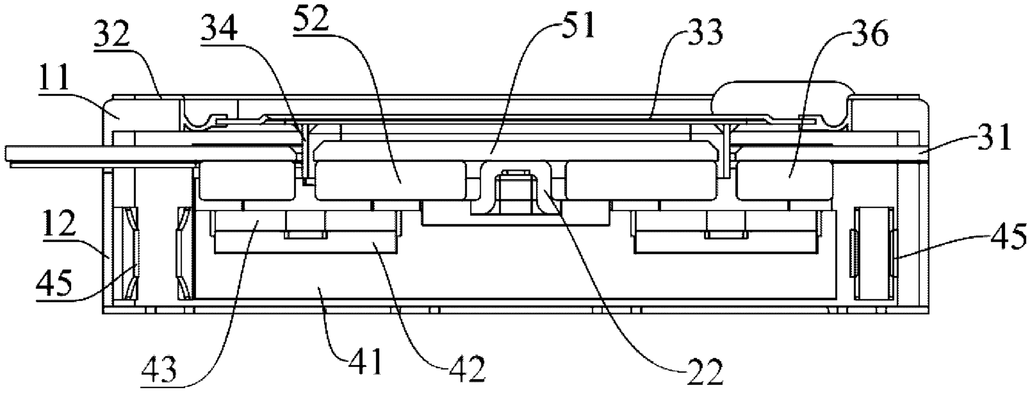
FIG. 24 is a cross-sectional view of view E-E of the view shown in FIG. 23 of the present disclosure.
Figure 25:
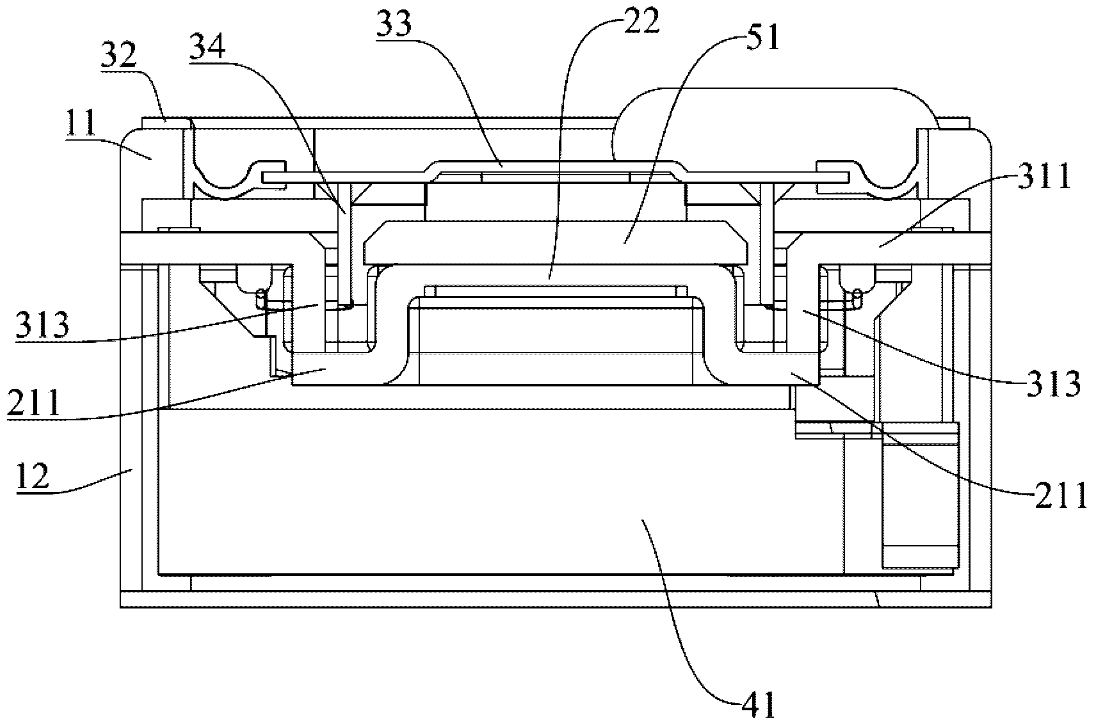
FIG. 25 is a cross-sectional view of view F-F of the view shown in FIG. 23 of the present disclosure.

The first magnetic guide 31 may be, for example, a magnetic guide of the sound generating unit 3 or a magnetic guide of the vibration unit 4, which is not specifically limited herein. Specifically, for example, the first magnetic guide 31 forms as a magnetic guide of the sound generating unit 3. As shown in FIG. 22, the sound generating unit 3 further includes a diaphragm 32, a voice coil 34, and an edge magnet 36, where the magnetic guide body 311 of the first magnetic guide 31 has an avoidance hole 310 for avoiding the voice coil 34, the top of the voice coil 34 is connected to the diaphragm 32, the edge magnet 36 is spaced apart from the main magnet 52, a magnetic gap is formed between the edge magnet 36 and the main magnet 52, and the bottom of the voice coil 34 passes through the avoidance hole 310 and extends to the magnetic gap. In some embodiments, the support arms 313 are vertically connected to the magnet guide body 311, and the hole wall of the avoidance hole 310 is flush with one side surface of the support arm 313. That is, the magnetic circuit assembly 5 is sequentially connected to the housing 1 by means of the connection assembly 2 and the sound generating unit 3 so that the sound quality of the sound generating unit 3 can be improved.

The assembly mode of the sound generating unit 3, the vibration unit 4 and the connection assembly 2 are briefly described below.

For the vibration unit 4, the counterweight 41 is disposed in the second housing 12. Specifically, with reference to FIG. 4, the vibration unit 4 of this embodiment further includes a second magnetic guide 42, a motor coil 43, a second circuit board 44, an elastic arm 45, and a solder lug 46. As shown in FIG. 9, a top surface of the counterweight 41 is provided with a mounting groove 412, and the second magnetic guide 42 may be, for example, disposed in the mounting groove 412 by laser welding or gluing. The motor coil 43 and the second circuit board 44 may be, for example, disposed on the second magnetic guide 42 by gluing, and one end of the second circuit board 44 is electrically connected to the motor coil 43, another end of the second circuit board 44 extends outside the housing 1, and another end of the second circuit board 44 is provided with a second pin 441, which is used for being electrically connected to an external circuit. As shown in FIG. 4, the bottom plate 6 extends outwardly with a support table 62, which is used for supporting the second pin 441. As shown in FIG. 4, in this embodiment, two mounting grooves 412, two second magnetic guides 42 and two motor coils 43 are provided, where each of the mounting grooves 412 is provided with a second magnetic guide 42 and a motor coil 43, the second circuit board 44 is provided with two connection ends and a second pin 441, and the two connection ends are respectively electrically connected to the two motor coils 43, so as to provide electric energy for the two motor coils 43 at the same time.

In this embodiment, the elastic arm 45 of the vibration unit 4 may be, for example, welded to an inner wall of the second housing 12. With reference to FIG. 4 and FIG. 7, the elastic arm 45 is disposed between the weight 41 and the housing 1 (i.e., the second housing 12), where the elastic arm 45 is U-shaped, and the elastic arm 45 can be pressed when the weight 41 moves. In this embodiment, each of the two sides of the weight 41 in the length direction (corresponding to the left-right direction of FIG. 4) is provided with a corresponding elastic arm 45. The elastic arm 45 and the solder lug 46 may be, for example, welded to the housing 1 by laser welding.

Figure 5:
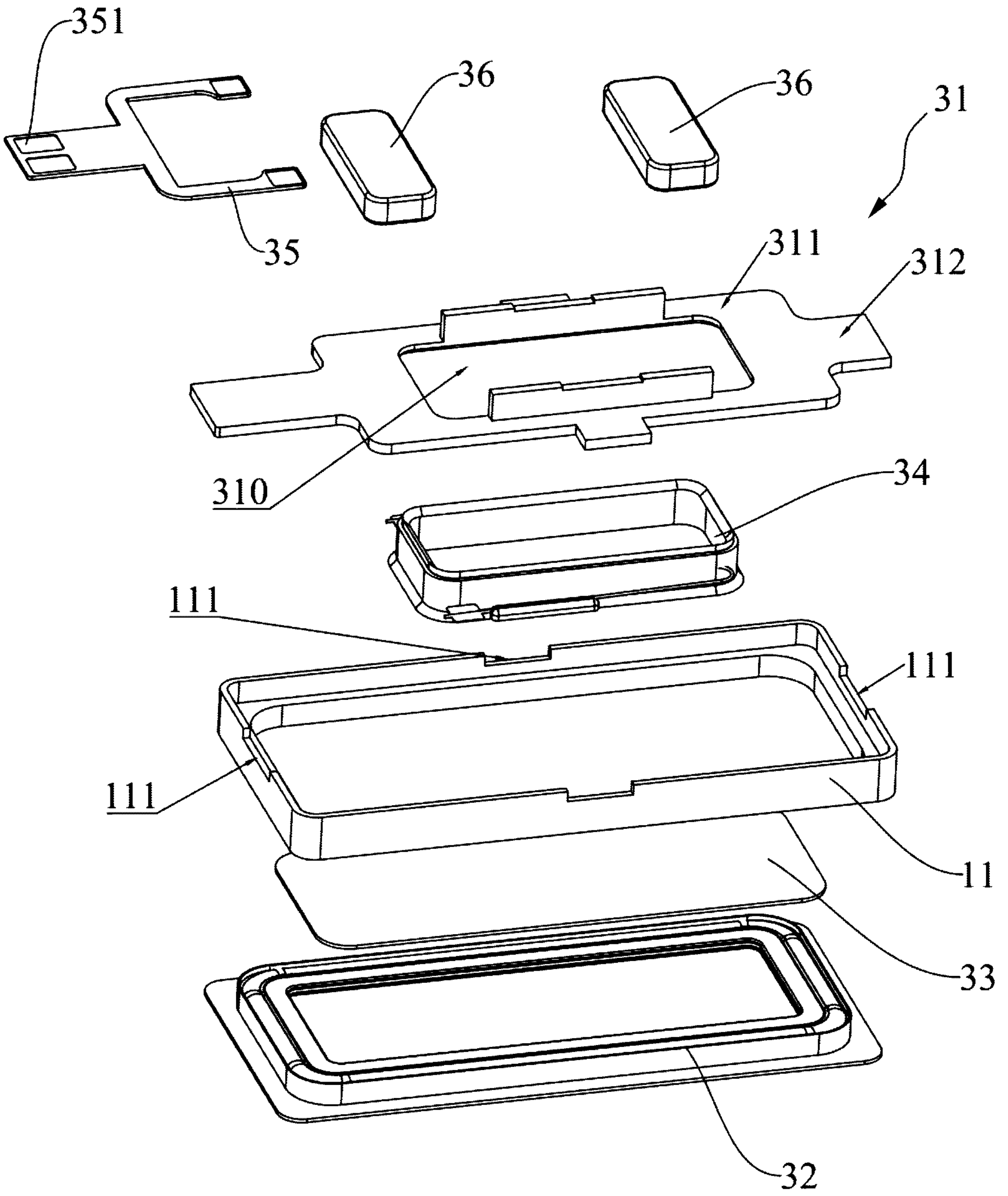
FIG. 5 is an exploded diagram of a sound generating unit of a loudspeaker module according to an embodiment of the present disclosure.
Figure 6:
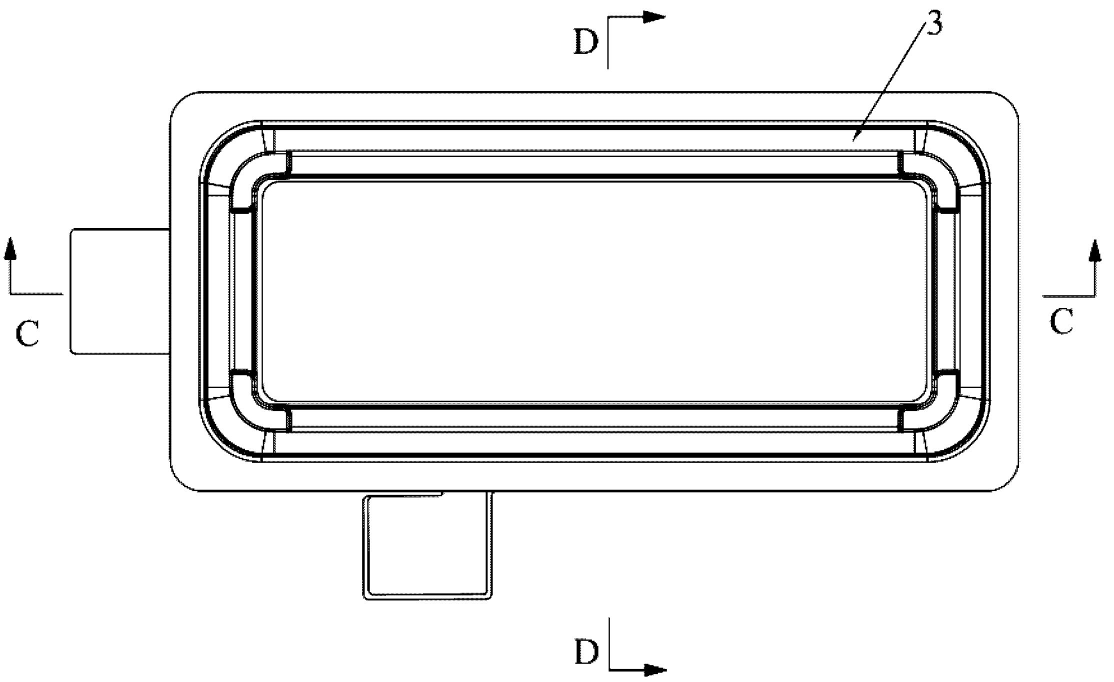
FIG. 6 is a top view of a loudspeaker module according to an embodiment of the present disclosure.
Figure 8:
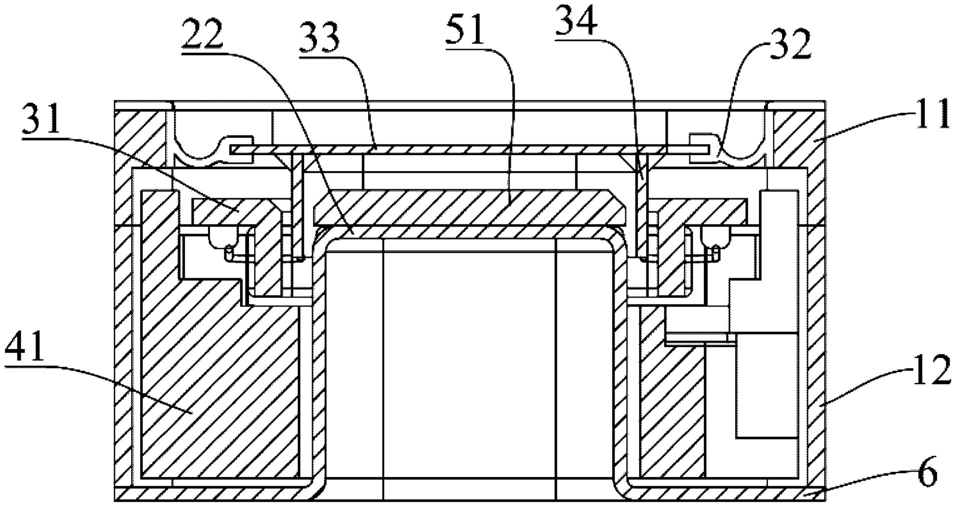
FIG. 8 is a cross-sectional view of view D-D of the view shown in FIG. 6 of the present disclosure.

For the sound generating unit 3, at least a part of the sound generating unit 3 may be provided, for example, in the first housing 11. Specifically, with reference to FIG. 5, FIG. 7, and FIG. 8, the sound generating unit 3 may further include a diaphragm 32, a middle stick 33, a voice coil 34, a first circuit board 35, and an edge magnet 36. The diaphragm 32 is disposed on the top of the housing 1, and the diaphragm 32 is connected to the outer periphery of the middle stick 33. Alternatively, the diaphragm 32 and the middle stick 33 may be, for example, integrally molded by injection, or may be connected by glue dispensing or by means of a pressure-sensitive adhesive (PSA). The side magnet 36 is fixed with the first magnetic guide 31 in an adhesive manner. In some embodiments, for example, two side magnets 36 may be provided, an edge magnet of the edge magnets 36 is spaced apart from the main magnet 52, and a magnetic gap is formed between the edge magnet 36 and the main magnet 52. The first magnetic guide 31 has an avoidance hole 310, the top of the voice coil 34 is connected to the middle stick 33 in a glue dispensing manner, and the bottom of the voice coil 34 passes through the avoidance hole 310 and extends to the magnetic gap. One end of the first circuit board 35 is electrically connected to the voice coil 34, and another end of the first circuit board 35 extends outside the housing 1 and has a first pin 351 for connecting with an external circuit so as to be able to supply electric energy to the voice coil 34. In some embodiments, the first circuit board 35 is disposed on the first magnetic guide 31 in an adhesive or a PSA manner. The diaphragm 32 is disposed on the top of the first housing 11, and the bottom of the first housing 11 is connected to the second housing 12. The first magnetic guide 31 is connected to the first housing 11, and the side magnet 36 is located in the second housing 12. The top of the voice coil 34 is located in the first housing 11, and the bottom of the voice coil 34 extends into the second housing 12. The first housing 11 has a sixth notch 111 facing the second housing 12, and an end surface of the second housing 12 facing the first housing 11 and the sixth notch 111 form a second positioning hole 102. In other embodiments, the second positioning hole 102 is also directly formed in the first housing 11.

It should be noted that the housing 1 may also be an integral structure, which is not limited in this embodiment. As shown in FIG. 16 and FIG. 17, the connection assembly 2 is located above the counterweight 41. In some embodiments, the counterweight 41 may also be provided with an avoidance groove for avoiding the connection assembly 2 so that the connection assembly 2 does not need to occupy the space in the height direction of the housing 1, and further, the thickness of the loudspeaker assembly does not increase with the connection assembly 2.

Figure 27:
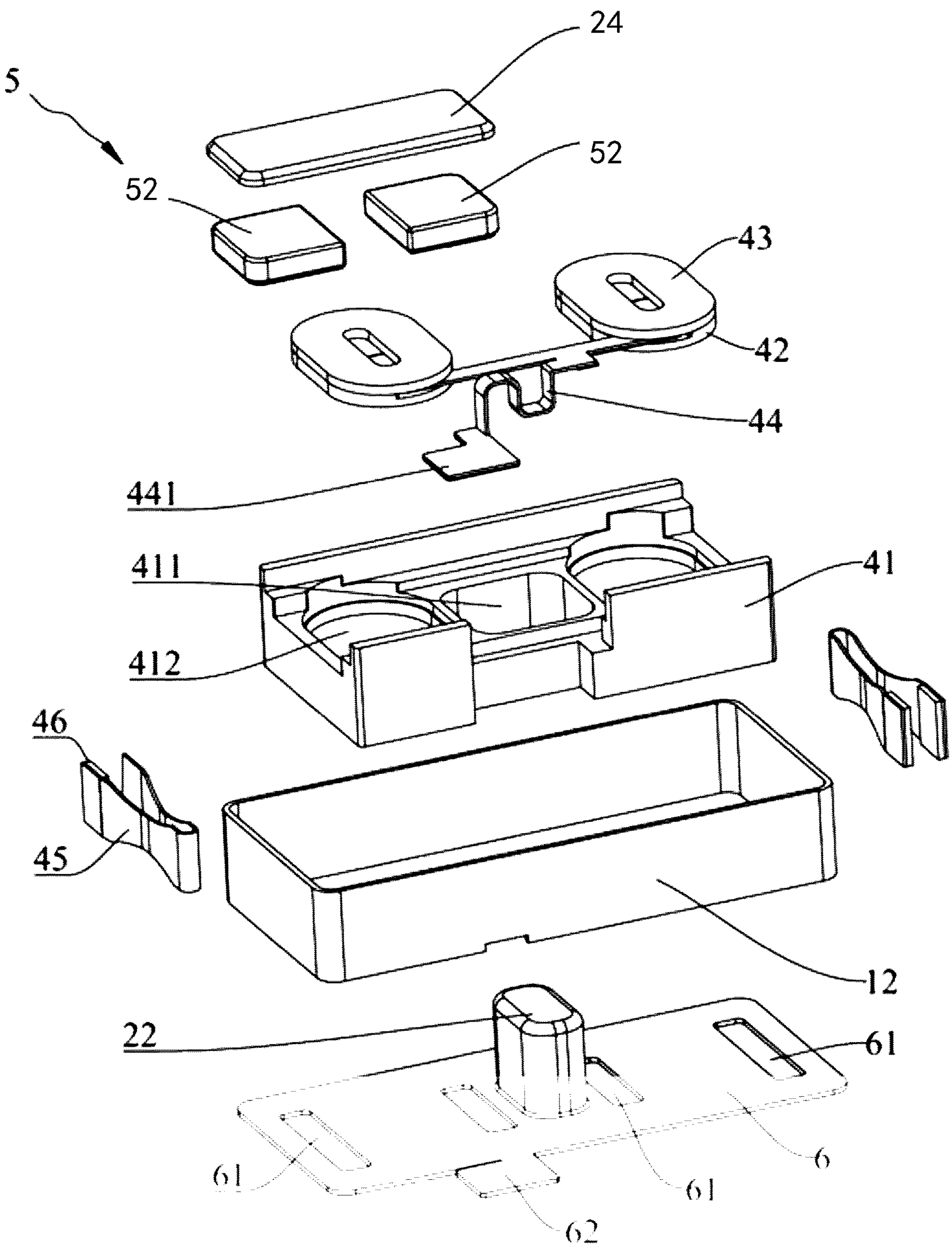
FIG. 27 is an exploded diagram of another vibration unit of a loudspeaker module according to an embodiment of the present disclosure.

In an embodiment of the present disclosure, referring to FIG. 27, a loudspeaker module includes a housing 1, a connection assembly 2 and a magnetic circuit assembly 5; a vibration unit 4 and a sound generating unit 3 are disposed in the housing 1; the connection assembly 2 comprises a connection plate 24 and a protrusion 22, one end of the protrusion 22 is connected to the housing 1; and the magnetic circuit assembly 5 is disposed between the vibration unit 4 and the sound generating unit 3, wherein the sound generating unit 3 shares the magnetic circuit assembly 5 with the vibration unit 4, and the magnetic circuit assembly 5 includes a main magnet 51 disposed on the connection plate 24.

As shown in FIG. 27, the connection assembly 2 includes a connection plate 24 and a protrusion 22, wherein one end of the protrusion 22 (corresponding to the lower end of FIG. 27) is connected to the housing 1, i.e., the protrusion 22 can be fixed to the housing 1. In the embodiment of the present disclosure, the protrusion 22 can be directly fixed to the housing 1, and in other embodiments, the protrusion 22 can be fixed to the housing 1 indirectly, which is not limited by the embodiment of the present disclosure. The present disclosure is not limited thereto. The other end of the protrusion 22 (corresponding to the upper end of FIG. 27) is connected to the connection plate 24, and in some embodiments, the other end of the convex portion 22 is connected to the bottom surface of the connection plate 24.

Referring to FIG. 27, the magnetic circuit assembly 5 includes a main magnet 52, and the main magnet 52 is provided on the connection plate 24, and in some embodiments, the main magnet 52 may be provided on the connection plate 24. In some embodiments of the present disclosure, for example, the main magnet 52 may be provided on the connection plate 24 by pasting or the like. It should be noted that the material of the connection plate 24 in the embodiment of the present disclosure may be metallic or non-metallic, and the embodiment of the present disclosure does not limit this. Optionally, the connecting plate 24 may have the effect of making the magnetic field generated by the main magnet 52 more uniform or enhancing the magnetic field, that is, the connecting plate 24 may also be a pole piece, so that the connecting plate 24 not only has the effect of mounting the magnetic circuit assembly 5, but also improves the magnetic field generated by the magnetic circuit assembly 5. In the embodiment of the present disclosure, the loudspeaker module further saves an internal space of the loudspeaker module by avoiding the installation of an additional magnetic field improvement component.

In an embodiment of the present disclosure, as shown in FIG. 27, the loudspeaker module further comprises a bottom plate 6, wherein the bottom plate 6 is provided at the bottom of the housing 1, and in some embodiments, the bottom plate 6 is connected to the bottom of the housing 1. The protrusion 22 is formed as a boss, and one end of the boss (corresponding to the lower end of FIG. 27) is connected to the bottom plate 6, and the other end of the boss (corresponding to the upper end of FIG. 27) extends toward the magnetic circuit assembly 5 and is connected to the connection plate 24. That is, by providing the boss on the bottom plate 6, the magnetic circuit assembly 5 is connected to the bottom plate 6 and the housing 1 via the connection plate 24 and the boss, and the mounting of the magnetic circuit assembly 5 is thereby realized.

The present disclosure also provides an electronic device. The electronic device includes the preceding loudspeaker module, and the loudspeaker module occupies a small space, thereby facilitating the optimal arrangement of various components in the electronic device. Specifically, in the loudspeaker module of this embodiment of the present disclosure, the installation reliability of the magnetic circuit assembly 5 is improved by providing the connection assembly 2, the thickness of the loudspeaker module is not increased, and the space utilization rate of the inner cavity of the housing 1 is improved, further facilitating the miniaturization of the loudspeaker module. It should be noted that the electronic device may be a wearable device, a mobile phone, a computer, or the like, which is not limited in this embodiment.

What is claimed is:

1. A loudspeaker module, comprising a housing, a connection assembly and a magnetic circuit assembly:

a vibration unit and a sound generating unit are disposed in the housing;

the connection assembly comprises a protrusion, one end of the protrusion is connected to the housing; and the magnetic circuit assembly is disposed between the vibration unit and the sound generating unit, wherein the sound generating unit shares the magnetic circuit assembly with the vibration unit, and the magnetic circuit assembly comprises:

a pole piece connected to another end of the protrusion; and a main magnet disposed on the pole piece.

2. The loudspeaker module of claim 1, further comprising:

a bottom plate disposed at a bottom of the housing, wherein the protrusion forms a boss, one end of the boss is connected to the bottom plate, and another end of the boss extends toward the magnetic circuit assembly and is connected to the pole piece.

3. The loudspeaker module of claim 2, wherein the vibration unit comprises a counterweight, and the counterweight has a first through hole; and the main magnet has a clearance through which the boss passes, and the another end of the boss sequentially passes through the first through hole and the clearance and is connected to the pole piece.

4. The loudspeaker module of claim 3, wherein one main magnet is provided, and the one main magnet has a second through hole.

5. The loudspeaker module of claim 3, wherein at least one pair of main magnets are disposed on two sides of the boss, wherein main magnets in each pair of the at least one pair of main magnets are spaced apart so that a clearance is formed.

6. The loudspeaker module of claim 5, wherein first positioning holes cooperating with the corresponding connection arms are formed on the housing, and each of the corresponding connection arms is disposed in a respective one of the first positioning holes.

7. The loudspeaker module of claim 6, wherein the housing is an integrated box structure with openings at two ends of the housing, and an aperture of each of the first positioning holes is larger than a longitudinal cross-sectional dimension of the connection assembly.

8. The loudspeaker module of claim 6, wherein the housing comprises a first housing and a second housing connected to the first housing, one of the vibration unit or the sound generating unit is disposed in the first housing, and another of the vibration unit or the sound generating unit is disposed in the second housing.

9. The loudspeaker module of claim 8, wherein the first housing has a first notch facing the second housing, and an end surface of the second housing and the first notch form a first positioning hole of the first positioning holes.

10. The loudspeaker module of claim 8, wherein the second housing has a second notch facing the first housing, and an end surface of the first housing and the second notch form a first positioning hole of the first positioning holes.

11. The loudspeaker module of claim 8, wherein a third notch corresponding to a connection arm of the connection arms is disposed on the first housing, a fourth notch corresponding to the third notch is disposed on the second housing, and the third notch and the fourth notch cooperate to form a first positioning hole of the first positioning holes.

12. The loudspeaker module of claim 8, wherein a first positioning hole of the first positioning holes is formed in a side wall of the first housing.

13. The loudspeaker module of claim 8, wherein a first positioning hole of the first positioning holes is formed in a side wall of the second housing.

14. The loudspeaker module of claim 1, wherein the connection assembly further comprises a base plate, the base plate is connected to the one end of the protrusion and has two outwardly extending connection arms, the connection arms are connected to the housing, at least two main magnets are provided, and the at least two main magnets are disposed on the pole piece on two sides of the protrusion.

15. The loudspeaker module of claim 14, wherein the base plate forms a cushion protrusion by stamping, a height of the cushion protrusion is lower than a height of the protrusion.

16. The loudspeaker module of claim 14, wherein an end of each of the connection arms is provided with a lapping structure, the lapping structure is an L-shaped groove, and the lapping structure is used for being connected to the housing.

17. The loudspeaker module of claim 14, wherein the sound generating unit comprises a first magnetic guide, the first magnetic guide comprises:

a magnetic guide body, wherein an edge of the magnetic guide body extends outwardly to form a plurality of cantilever arms, a second positioning hole corresponding to a cantilever arm of the plurality of cantilever arms is formed on the housing, and the cantilever arm is disposed in a corresponding second positioning hole; and two support arms extending toward the base plate are formed on the magnetic guide body, the two support arms are in one-to-one correspondence with the connection arms, each of the support arms is provided with a fifth notch cooperating with a corresponding connection arm, and the corresponding connection arm is disposed in the fifth notch.

18. The loudspeaker module of claim 17, wherein the sound generating unit further comprises a diaphragm, a voice coil, and an edge magnet, wherein the first magnetic guide has an avoidance hole for avoiding the voice coil, a top of the voice coil is connected to the diaphragm, the edge magnet is spaced apart from the main magnet, a magnetic gap is formed between the edge magnet and the main magnet, and a bottom of the voice coil passes through the avoidance hole and extends to the magnetic gap.

19. A loudspeaker module, comprising a housing, a connection assembly and a magnetic circuit assembly;

a vibration unit and a sound generating unit are disposed in the housing;

the connection assembly comprises a connection plate and a protrusion, one end of the protrusion is connected to the housing; and the magnetic circuit assembly is disposed between the vibration unit and the sound generating unit, wherein the sound generating unit shares the magnetic circuit assembly with the vibration unit, and the magnetic circuit assembly comprises a main magnet disposed on the connection plate.

20. An electronic device, comprising a loudspeaker module, wherein the loudspeaker module comprising a housing, a connection assembly and a magnetic circuit assembly;

a vibration unit and a sound generating unit are disposed in the housing;

the connection assembly comprises a protrusion, one end of the protrusion is connected to the housing; and the magnetic circuit assembly disposed between the vibration unit and the sound generating unit, wherein the sound generating unit shares the magnetic circuit assembly with the vibration unit, and the magnetic circuit assembly comprises:

a pole piece connected to another end of the protrusion; and a main magnet disposed on the pole piece.

* * * * *